United States Patent
Morijiri et al.

(10) Patent No.: US 8,332,648 B2
(45) Date of Patent: Dec. 11, 2012

(54) VERIFICATION APPARATUS AND PROGRAM

(75) Inventors: Tomoaki Morijiri, Chofu (JP); Koji Okada, Tokyo (JP); Tatsuro Ikeda, Fuchu (JP); Minoru Nishizawa, Fuchu (JP); Hidehisa Takamizawa, Fuchu (JP); Yoshihiro Fujii, Fuchu (JP); Asahiko Yamada, Tokorozawa (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 310 days.

(21) Appl. No.: 12/695,781

(22) Filed: Jan. 28, 2010

(65) Prior Publication Data
US 2010/0180124 A1 Jul. 15, 2010

Related U.S. Application Data

(63) Continuation of application No. PCT/JP2008/063777, filed on Jul. 31, 2008.

(30) Foreign Application Priority Data

Aug. 1, 2007 (JP) ................................. 2007-201139

(51) Int. Cl.
G06F 21/00 (2006.01)
(52) U.S. Cl. ...................................................... 713/176
(58) Field of Classification Search ................... 713/176
See application file for complete search history.

(56) References Cited

U.S. PATENT DOCUMENTS

2001/0027527 A1* 10/2001 Khidekel et al. ............. 713/201
2006/0293925 A1* 12/2006 Flom ................................ 705/3

FOREIGN PATENT DOCUMENTS

| JP | 2006-011768 | 1/2006 |
| JP | 2006-11768 | 1/2006 |
| WO | 2007-007690 | 1/2007 |

OTHER PUBLICATIONS

Hidehisa Takamizawa et al., An Online System Using Biometric Authentication Context, Computer Security Symposium 2005, Information Processing Society of Japan, 2005 (13. vol. 1) p. 313-318 (with English Abstract).

Koji Okada et al., "Extensible Personal Authentication Framework using Biometrics and PKI", Pre-Proceedings of the $3^{rd}$ International Workshop for Applied PKI (IWAP2004), Oct. 3-5, 2004, pp. 96-107.

* cited by examiner

*Primary Examiner* — William Goodchild
(74) *Attorney, Agent, or Firm* — Oblon, Spivak, McClelland, Maier & Neustadt, L.L.P.

(57) ABSTRACT

According to one embodiment of the present invention, the first authentication context includes the template certificate indicative of the validity of a template and the first apparatus evaluation certificate indicative of the validity of the first apparatus evaluating information while the second authentication context includes the second apparatus evaluating certificate indicative of the validity of the second apparatus evaluating information. And the template certificate and the first and second evaluation certificates are verified when verifying the first and second authentication contexts. Thus, the validity of the template used for authentication or the apparatus evaluating information included in the authentication context can be verified.

4 Claims, 11 Drawing Sheets

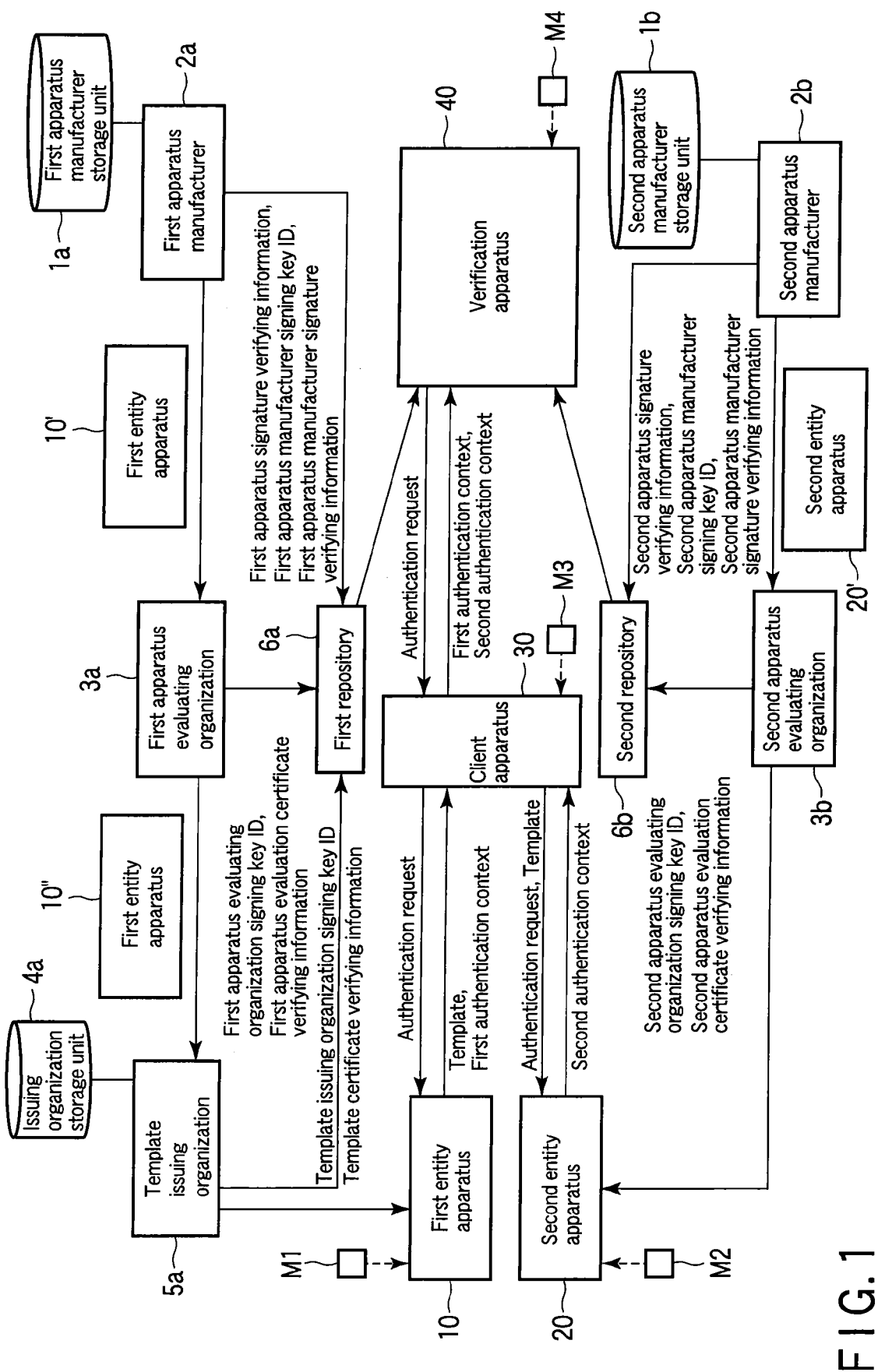
F I G. 1

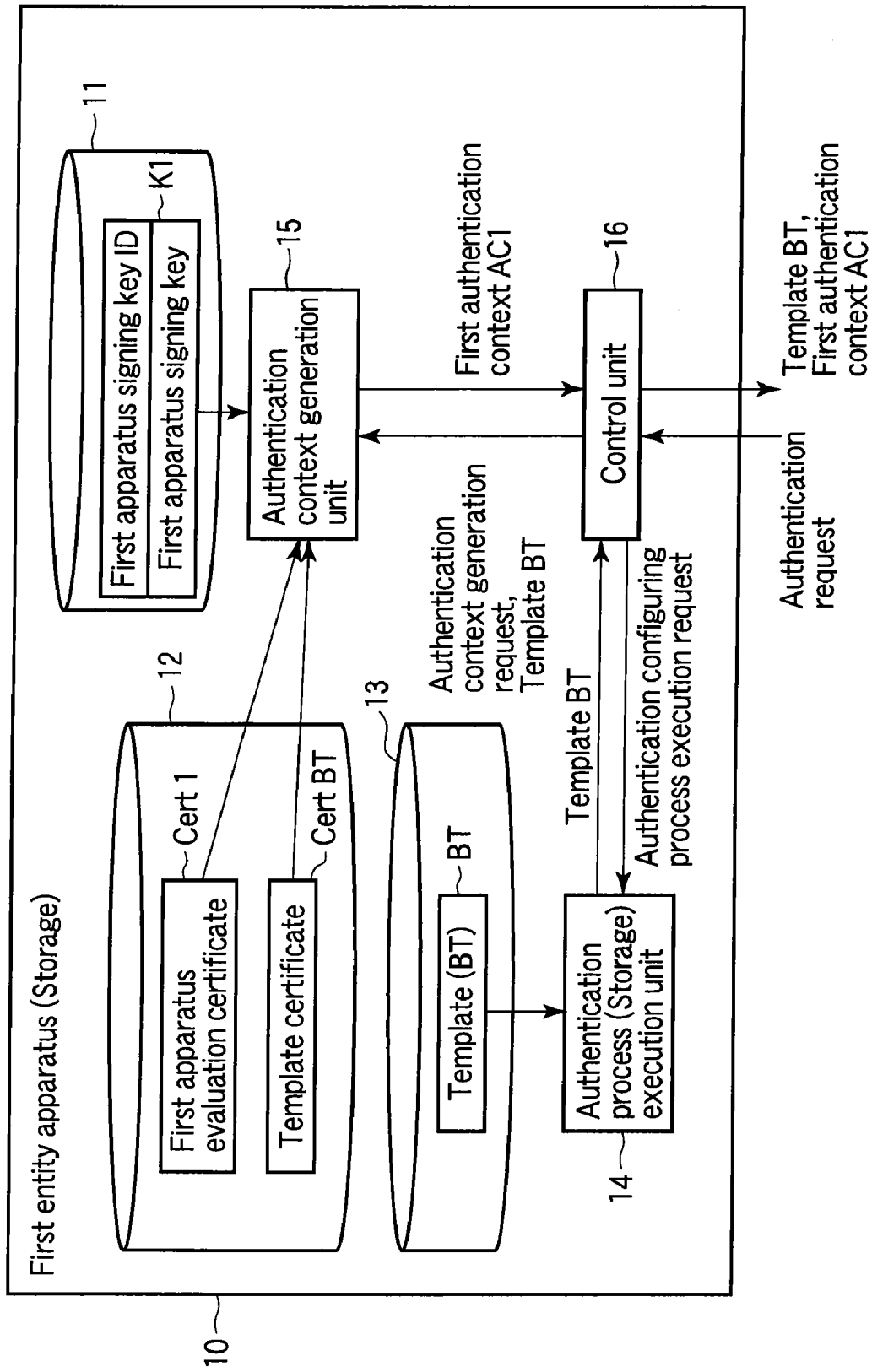
F I G. 3

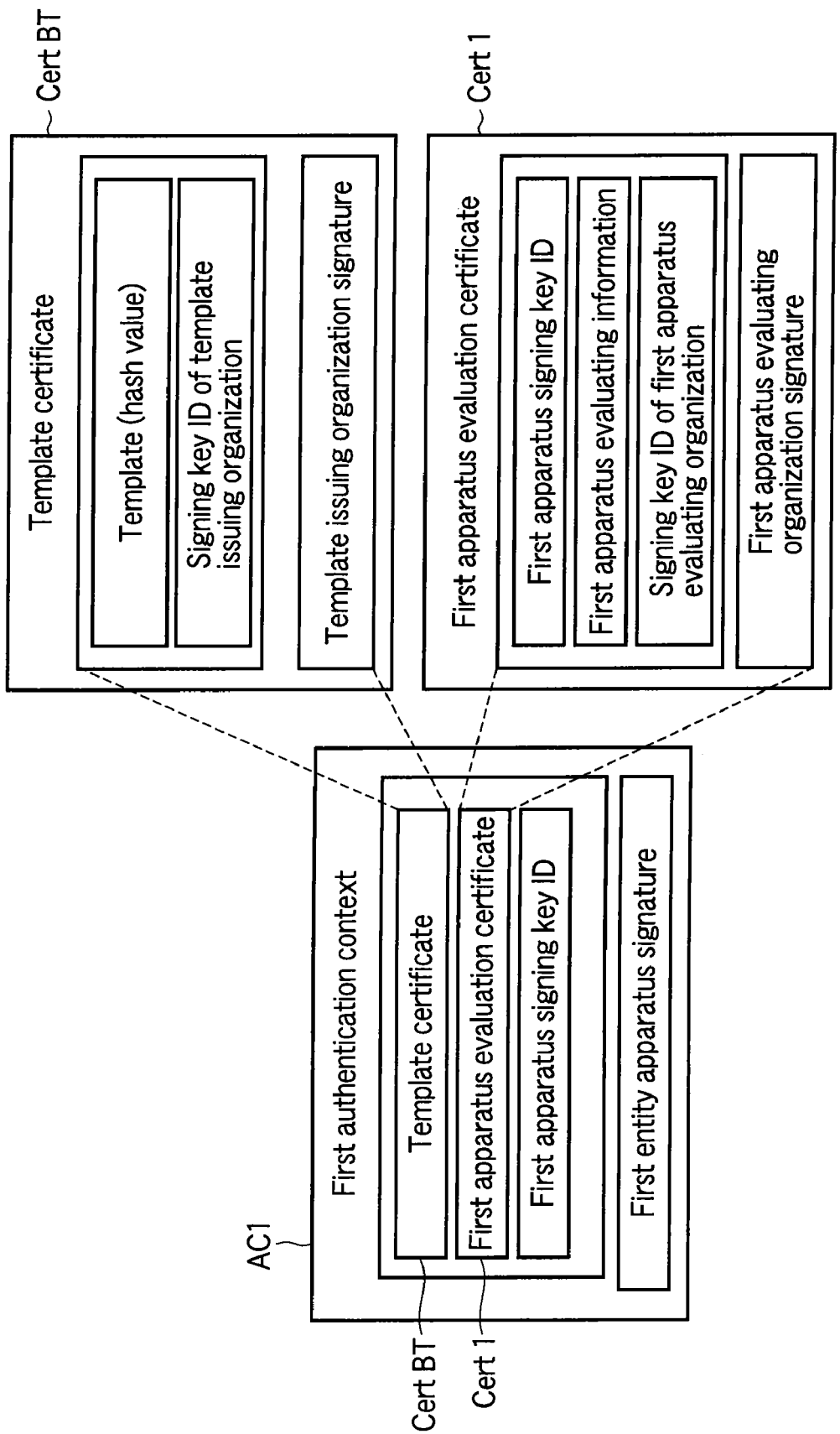
F I G. 4

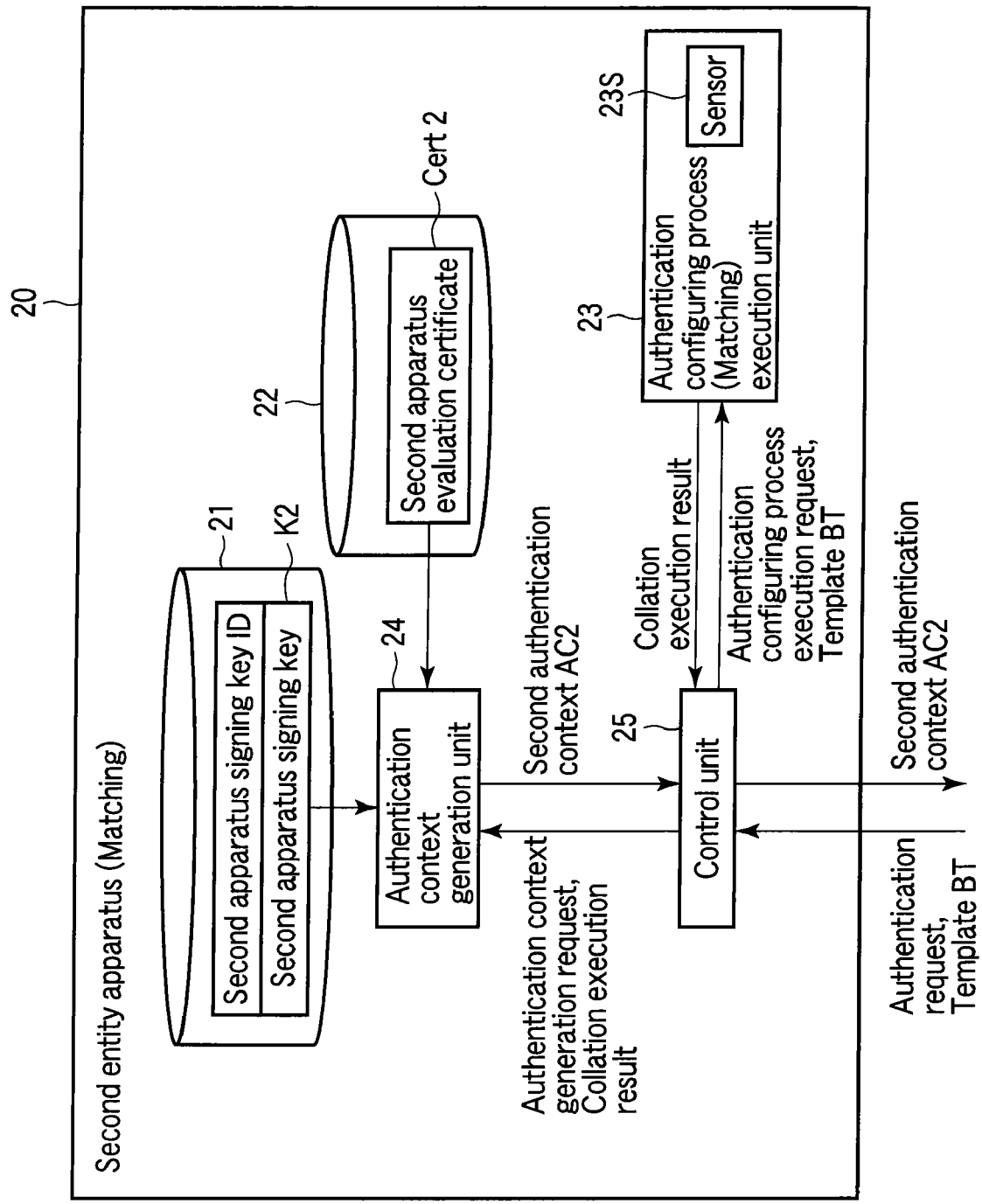
F I G. 5

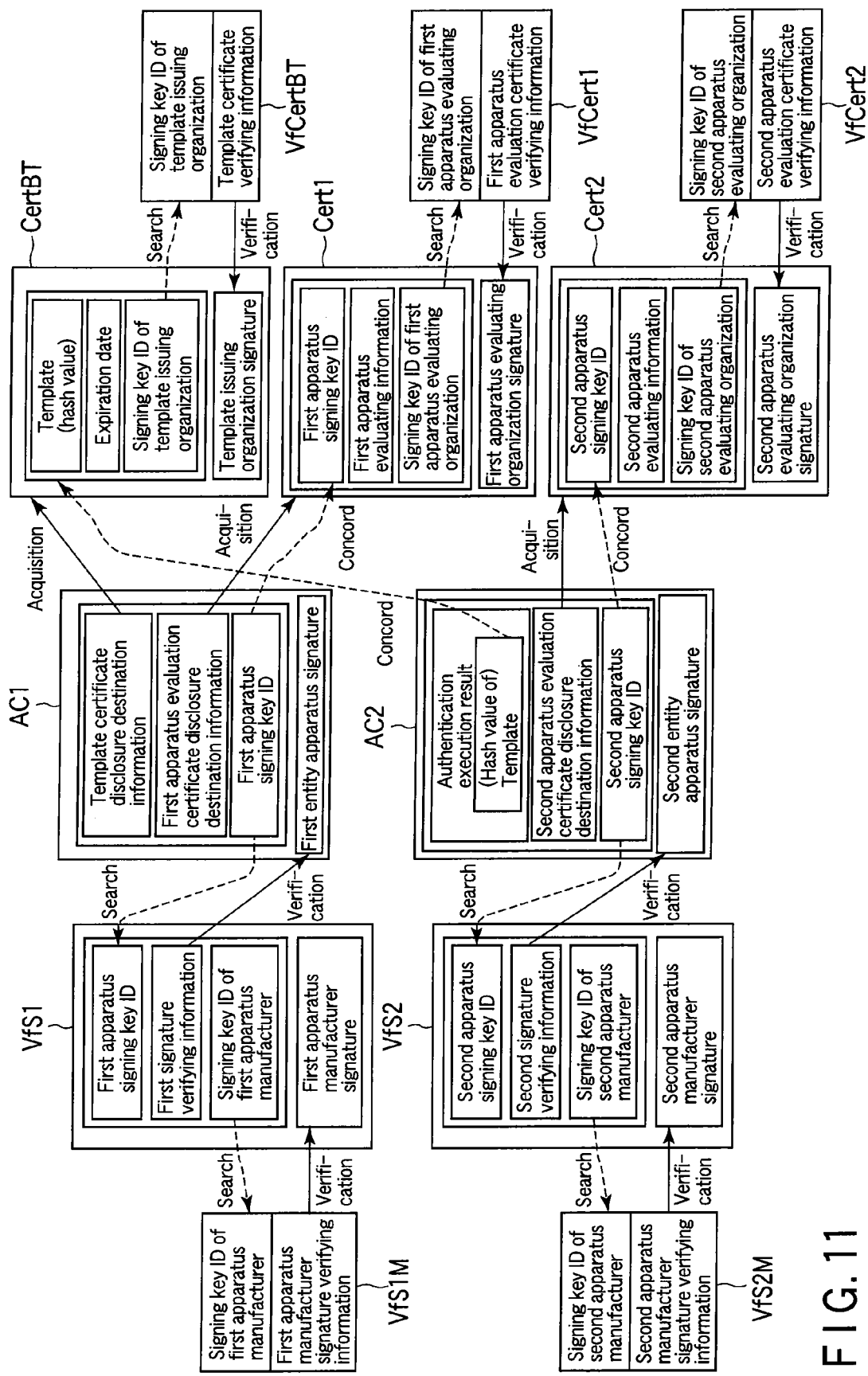
F I G. 11

VERIFICATION APPARATUS AND PROGRAM

CROSS REFERENCE TO RELATED APPLICATIONS

This is a Continuation Application of PCT Application No. PCT/JP2008/063777, filed Jul. 31, 2008, which was published under PCT Article 21(2) in Japanese.

This application is based upon and claims the benefit of priority from prior Japanese Patent Application No. 2007-201139, filed Aug. 1, 2007, the entire contents of which are incorporated herein by reference.

BACKGROUND OF THE INVENTION

1. Field of the Invention

The present invention relates to a verification apparatus and a program for use in a biometric authentication system, and it relates to, e.g., a verification apparatus and a program that can verify the validity of apparatus evaluating information included in a template or an authentication context utilized for authentication.

2. Description of the Related Art

When realizing communication or services through a network, an authentication technology for authenticating the other party is important. In the authentication technology, with the spread of recent open network environments and development of federation technologies of dispersed service resources, authentication targets are expanding from users to device terminals.

Usually, as part of the authentication technology, rigorously identifying or collating an authentication target is requested. When the authentication target is a person, a principal confirmation technology for rigorously confirming whether this person is a principal is required.

As a promising principal confirmation technology, there is biometrics. Biometrics is a technology for collating biometric information read from each person with previously registered biometric information (a template) to confirm whether that person is a principal based on the similarity. Biometric information is information indicative of physical/behavioral features or characteristics peculiar to each person, and fingerprints, irises, retinas, faces, voice, key strokes, signatures, or other characteristics are utilized.

Biometrics utilizes biometric information, which cannot be lost of forgotten, differing from existing authentication methods such as passwords, whereby a burden on users can be reduced. Further, as copying biometric information is difficult, biometrics is effective for, e.g., measures which prevent imitation of users.

Currently, biometrics is used for principal authentication adopting a specific apparatus, e.g., user authentication at the time of entering or exiting a specific room or authentication of depositors at ATMs of banks.

Biometrics is not restricted to these examples, and expectations for using biometrics for, e.g., authentication of other parties in electronic business transactions in an open network typified by the Internet are increasing.

When utilizing biometrics through a network, however, there is an inconvenience that a verifier cannot verify whether processing, such as acquisition or collation of biometric information executed on an authentication target side, has been really executed in an appropriate environment. Here, the "environment" means an apparatus that executes the processing, e.g., acquisition or collation of biometric information or information utilized for biometric collation (e.g., biometric reference information (a template)). The "appropriate environment" means that an apparatus or information is not falsified or that unauthorized information is not used.

Furthermore, it is often the case that biometrics processing is constituted of a plurality of processes (constituent processes) and the respective constituent processes are assigned to and arranged in a plurality of apparatuses to be executed. This also makes verification of the appropriate environment difficult.

Here, the constituent process means each process such as storage of a template, acquisition of biometric information, signal processing for the acquired biometric information, collation processing for the biometric information subjected to the signal processing and a template, judgment processing for judging a principal based on a result (e.g., similarity) of the collation processing, or other process.

Each constituent process can be arranged in many ways. As respective arrangement examples, there are an STOC (STore On Card) model, an MOC (Match on Card) model, an SOC (System on Card) model, a multi-modal model, and a server collation model.

In the STOC (STore On Card) model, templates are stored on an IC card, a template meeting a request is output, biometric information is acquired in a biometrics apparatus, and signal processing, collation processing, and judgment processing are executed. In the MOC (Match on Card) model, acquisition of biometric information and signal processing for this information are executed in a biometrics apparatus, and storage of templates, collation processing, and judgment processing are executed on an IC card. In the SOC (System on Card) model, all constituent processes are executed on an IC card. The multi-modal model is biometrics using a plurality of biometric characteristics (e.g., a fingerprint and a face) and has a more complicated arrangement. For example, in the multi-modal model, acquisition of biometric information of each of a fingerprint and a face and signal processing are executed in a fingerprint sensor apparatus and a camera apparatus, templates of the fingerprint and the face are stored on an IC card, and collation processing for each of the fingerprint and the face and judgment processing merging respective collation results are executed in a collation apparatus. In the server collation model, templates are stored on an IC card, a template meeting a request is output, acquisition of biometric information and signal processing for this information are executed in a biometrics apparatus, the template and the biometric information subjected to the signal processing are transmitted to a server, collation processing and judgment processing are executed in the server.

As explained above, each constituent process in the biometrics processing is arranged and executed in each of various apparatuses on an authentication target side. Therefore, it is difficult for the verifier side to verify whether each constituent process has been executed in a really appropriate environment.

Here, as a technology that can solve this inconvenience, there is known an authentication system using biometrics-oriented authentication contexts (which will be referred to as biometric contexts hereinafter) (e.g., see JP-A 2006-11768 (KOKAI) and Koji Okada, Tatsuro Ikeda, Hidehisa Takamizawa, Toshiaki Saisho, Extensible Personal Authentication Framework using Biometrics and PKI, Pre-Proceedings of The 3rd International workshop for Applied PKI (IWAP2004), pp. 96-107).

Biometric context technology is a technology in which an entity apparatus which executes each constituent process in biometrics processing guarantees and reports its execution result, whereby the verifier side can verify the integrity of an execution result of each constituent process. Here, the entity apparatus means an entity that executes each constituent process in biometrics processing, such as a biometric information sensor apparatus, biometric collation apparatus, or an IC card that stores templates.

Specifically, each entity apparatus outputs a biometric authentication context including an execution result of an executed constituent process and an authenticator generated from the execution result by using key information. A verifier can verify the integrity of the execution result by verifying the authenticator in the biometric context.

BRIEF SUMMARY OF THE INVENTION

According to examinations conducted by the present inventor, such a biometric authentication context technology guarantees the integrity of a template or apparatus evaluating information by putting biometric reference information (templates) stored in the entity apparatus or apparatus evaluating information for an apparatus in an authentication context. Here, the apparatus evaluating information is information indicative of evaluation of the accuracy of a constituent process executed by the apparatus or security strength of the apparatus. This biometric context technology assumes that correct templates or apparatus evaluating information is stored in the apparatus. In other words, an entity apparatus manufacturer guarantees the integrity of templates or apparatus evaluating information.

In actual operations, however, the entity apparatus manufacturer is often different from a template issuing organization. For example, there can be considered a situation in which an IC card issuing manufacturer (an entity apparatus manufacturer) manufactures and issues an IC card having an empty data region and then a biometric information registration authority (a template issuing organization) manufactures and issues a template to be stored in the IC card. In this case, the IC card issuing manufacturer cannot guarantee that the template stored in the IC card is correct. The term "issuing" used herein has a meaning of an "act of manufacturing" or an "act of incorporating in an apparatus" when a target is an "apparatus", and it has a meaning of an "act of transmitting" when a target is "data" or "information. Further, there can be also considered a situation in which another organization (e.g., a bank that provides biometric authentication services) stores a template issued by the biometric information registration authority in the IC card. In such cases, there is an inconvenience that a verifier cannot verify that the template utilized for authentication is correct based on the verification of an authenticator of a biometric authentication context alone.

Furthermore, since the apparatus evaluating information involves a possibility that an apparatus manufacturer itself disguises evaluation, providing evaluation by a third party organization different from the apparatus manufacturer is common, and a verifier must be able to verify that the third party organization has correctly provided the evaluation.

Moreover, the apparatus evaluating information is not fixed, and it must be updated. For example, when the security strength of an apparatus is lowered due to discovery of a new attack, the apparatus evaluating information must be updated.

However, as there are many entity apparatuses in circulation as products, updating apparatus evaluating information of all the entity apparatuses is difficult. Here, a technique of adding a function of updating the apparatus evaluating information through a network to each entity apparatus can be considered. However, the technique of adding such a complicated function to a personal product like the entity apparatus increases the price of the entity apparatus, and hence is unrealistic.

The above-described contents can be summarized into the following two problems.

As a first problem, verifying the validity of a template utilized for authentication or that of apparatus evaluating information (whether it has been issued by an appropriate organization) included in an authentication context from a verifier must be enabled.

As a second problem, when a template certificate or apparatus evaluating information must be changed, reflecting this change in all entity apparatuses must be facilitated.

It is an object of the present invention to provide a verification apparatus and a program that can verify the validity of a template utilized for authentication or apparatus evaluating information included in an authentication context.

It is another object of the present invention to provide a verification apparatus and a program that can easily reflect a change of a template certificate or apparatus evaluating information in all entity apparatuses when such a change is made.

According to the first aspect of the present invention, there is provided a verification apparatus which verifies respective authentication contexts received from a client apparatus connected with a first entity apparatus which generates a first authentication context and a second entity apparatus which generates a second authentication context, comprising: a storage device which stores first apparatus signature verifying information having a first apparatus ID, a first apparatus manufacturer ID and first apparatus manufacturer signature verifying information which are associated with each other, a first apparatus evaluating organization ID and first apparatus evaluation certificate verifying information which are associated with each other, a template issuing organization ID and template certificate verifying information which are associated with each other, a second apparatus signature verifying information having a second apparatus ID, a second apparatus manufacturer ID and second apparatus manufacturer signature verifying information which are associated with each other, and a second apparatus evaluating organization ID and second apparatus evaluation certificate verifying information which are associated with each other; and a control device configured to execute first to 10th verification processing and judgment processing, the respective pieces of processing including: first verification processing of searching the storage device by using the first apparatus ID in the first authentication context and verifying a first entity apparatus signature in the first authentication context based on the first apparatus signature verifying information associated with the first apparatus ID upon receiving via the client apparatus from the first entity apparatus the first authentication context including (a1) a template certificate obtained by adding a template issuing organization signature to template correspondence information and the template issuing organization ID, (a2) a first apparatus evaluation certificate obtained by adding a first apparatus evaluating organization signature to the first apparatus ID, first apparatus evaluating information, and the first apparatus evaluating organization ID, (a3) the first apparatus ID, and (a4) the first entity apparatus signature added to the template certificate, the first apparatus evaluation certificate, and the first apparatus ID; second verification processing of searching the storage device by using the first apparatus ID in the first authentication context to read first apparatus signature verifying information having the first apparatus ID from the storage device and searching the storage device by using the first apparatus manufacturer ID in the first apparatus signature verifying information to verify a first apparatus manufacturer signature in the first apparatus signature verifying information based on the first apparatus manufacturer signature verifying information associated with the first apparatus manufacturer ID in the storage device; third verification processing of verifying that the first apparatus ID in the first authentication context coincides with the first apparatus ID in the first apparatus evaluation certificate of the first authentication context; fourth verification processing of searching the storage device by using the first apparatus evaluating organization ID in the first apparatus evaluation certificate to verify the first apparatus evaluating organization signature in the first apparatus evaluation certificate based on first apparatus evaluating organization verifying information associated with the first apparatus evaluating organization ID in the storage device; fifth verification processing of searching the storage device by using the template issuing organization ID in the template certificate of the first authentication context to verify the template issuing organization signature in the template certificate based on template issuing organization verifying information associated with the template issuing organization ID in the storage device; sixth verification processing of searching the storage device by using the second apparatus ID in the second authentication context to verify a second entity apparatus signature in the second authentication context based on the second apparatus signature verifying information associated with the second apparatus ID in the storage device upon receiving through the client apparatus from the second entity apparatus the second authentication context including (b1) an authentication execution result, (b2) template correspondence information, (b3) a second apparatus evaluation certificate obtained by adding a second apparatus evaluating organization signature to the second apparatus ID, the second apparatus evaluating information, and the second apparatus evaluating organization ID, and (b4) the second entity apparatus signature added to the authentication execution result, the template correspondence information, the second apparatus evaluation certificate, and the second apparatus ID; seventh evaluation processing of searching the storage device by using the second apparatus ID in the second authentication context to read the second apparatus signature verifying information having the second apparatus ID from the storage device and searching the storage device by using the second apparatus manufacturer ID in the second apparatus signature verifying information to verify a second apparatus manufacturer signature in the second apparatus signature verifying information based on the second apparatus manufacturer signature verifying information associated with the second apparatus manufacturer ID in the storage device; eighth verification processing of verifying that the second apparatus ID in the second authentication context coincides with the second apparatus ID in the second apparatus evaluation certificate of the second authentication context; ninth verification processing of searching the storage device by using the second apparatus evaluating organization ID in the second apparatus evaluation certificate to verify a second apparatus evaluating organization signature in the second apparatus evaluation certificate based on the second apparatus evaluating organization verifying information associated with the second apparatus evaluating organization ID in the storage device; 10th verification processing of verifying that the template correspondence information in the second authentication context coincides with the template correspondence information in the template certificate of the first authentication context; and the judgment processing of determining that the first and second contexts are valid when all verification results obtained by the first to 10th verification processing are valid.

According to a second aspect of the present invention, there is provided, in the first aspect, the verification apparatus, wherein, when a template certificate disclosure destination information and first apparatus evaluation certification disclosure destination information are used in place of the template certificate and the first apparatus evaluation certificate as the first authentication context, and second apparatus evaluation certificate disclosure destination information is used in place of the second apparatus evaluation certificate as the second certificate context, the control device further executes: processing of acquiring the template certificate and the first apparatus evaluation certificate from a disclosure destination apparatus based on the template certification disclosure destination information and the first apparatus evaluation certificate disclosure destination information included in the first authentication context received from the client apparatus and writing them in the storing means; and processing of acquiring the second apparatus evaluation certificate from the disclosure destination apparatus based on the second apparatus evaluation certificate disclosure destination information included in the second authentication context received from the client apparatus and writing it in the storage device.

According to the first aspect, the first authentication context includes the template certificate indicative of the validity of a template and the first apparatus evaluation certificate indicative of the validity of the first apparatus evaluating information whilst the second authentication context includes the second apparatus evaluating certificate indicative of the validity of the second apparatus evaluating information, and the validity of the template used for authentication or the apparatus evaluating information included in the authentication context can be verified by verifying the template certificate or the first and second evaluation certificates when verifying the first and second authentication contexts.

According to the second aspect, since the template certificate and the first apparatus evaluation certificate are acquired from the disclosure destination apparatus based on the template certification disclosure destination information and the first apparatus evaluation certificate disclosure destination information included in the first authentication context and the second apparatus evaluation certificate is acquired from the disclosure destination apparatus based on the second apparatus evaluation certificate disclosure destination information included in the second authentication context, updating each certificate in the disclosure destination apparatus when updating each certificate, thereby readily reflecting the change in all entity apparatuses when the template certificate or the apparatus evaluating information are changed.

BRIEF DESCRIPTION OF THE SEVERAL VIEWS OF THE DRAWING

FIG. 1 is a schematic view showing a configuration of a biometric authentication system to which a verification apparatus according to a first embodiment of the present invention is applied;

FIG. 3 is a schematic view showing a configuration of a first entity apparatus in the first embodiment;

FIG. 4 is a schematic view showing a configuration of a first authentication context in the first embodiment;

FIG. 5 is a schematic view showing a configuration of a second entity apparatus in the first embodiment;

FIG. 11 is a schematic view for explaining a verifying operation in the second embodiment.

DETAILED DESCRIPTION OF THE INVENTION

In the following, each embodiment of the present invention will be explained with reference to the drawings.

First Embodiment

Figure 2:
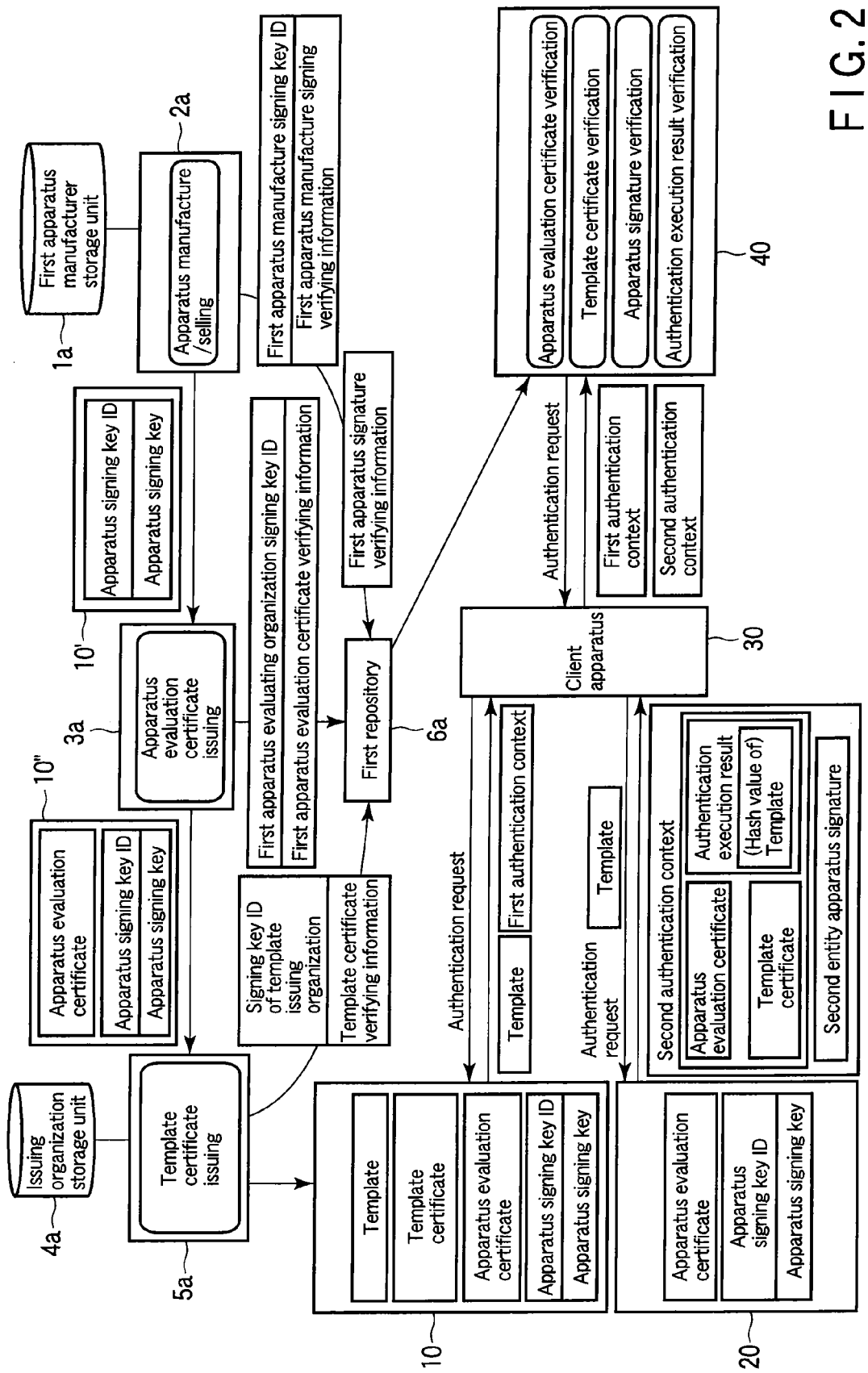
FIG. 2 is a schematic view showing a configuration of a part of the biometric authentication system in the first embodiment.

FIG. 1 is a schematic view showing a configuration of a biometric authentication system to which a verification apparatus according to a first embodiment of the present invention is applied, and FIG. 2 is a schematic view showing a configuration of a part of this system. This biometric authentication system includes first and second manufacturer storage units $1a$ and $1b$, first and second apparatus manufacturer $2a$ and $2b$, first and second apparatus evaluating organizations $3a$ and $3b$, an issuing organization storage unit $4a$, a template issuing organization $5a$, first and second repositories $6a$ and $6b$, a first entity apparatus 10, a second entity apparatus 20, a client apparatus 30, and a verification apparatus 40.

It is to be noted that the first and second apparatus manufacturers $2a$ and $2b$, the template issuing organization $5a$, and the first and second repositories $6a$ and $6b$ are computers as hardware resources, respectively. Further, reference character "a" denotes an apparatus that provides information concerning the first entity apparatus 10, and reference character "b" designates an apparatus that provides information concerning the second entity apparatus.

Figure 9:
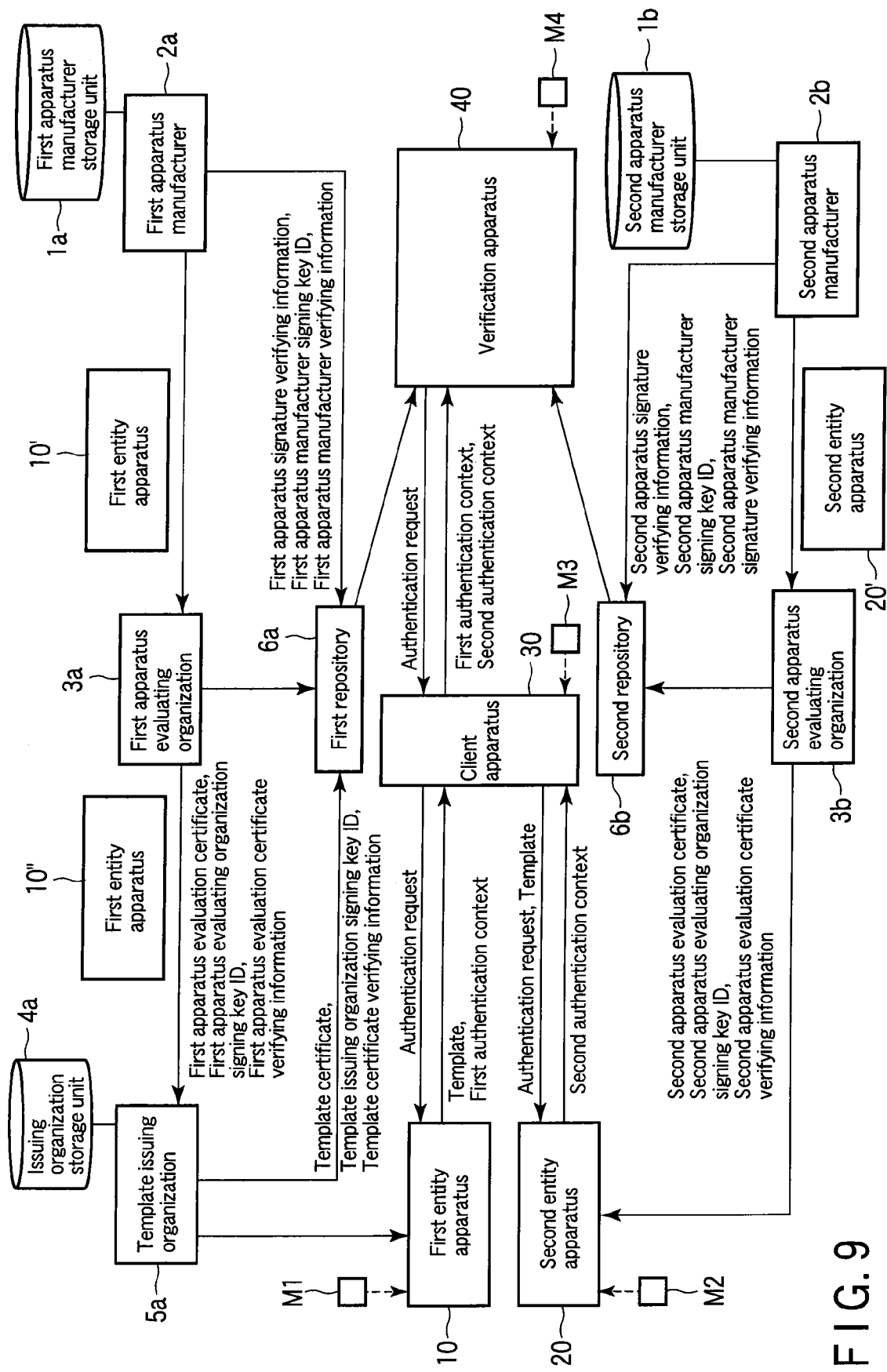
FIG. 9 is a schematic view showing a configuration of a biometric authentication system to which a verification apparatus according to a second embodiment of the present invention is applied.

Furthermore, each of the first and second entity apparatuses 10 and 20, the client apparatus 30, and the verification apparatus 40 can be carried out in the form of a hardware configuration or a combination of a hardware resource and software in accordance with each of the apparatuses 10, 20, 30, and 40. As the software that is used for the combination, for example, as shown in FIGS. 1 and 9, a program that is previously installed in a computer of the corresponding apparatus 10, 20, 30, or 40 from a network or a storage medium M1, M2, M3, or M4 to realize functions of the corresponding apparatus 10, 20, 30, or 40 is used.

Moreover, in the following description, a certificate is information that enables verifying the validity of contents by using verifying information issued by an issuing entity for the certificate, and it is, e.g., information having a signature added thereto by using a signing key of an issuing organization. The signature is, e.g., a digital signature or an authenticator (MAC: Message Authentication Code), and the verifying information is, e.g., a verification key of a digital signature or the authenticator. However, of the verifying information, each of first and second apparatus signature verifying information includes an apparatus signing key ID, an apparatus manufacturer signing key ID, and an apparatus manufacture signature besides the verification key (e.g., a public key). In regard to the term " ... signing key ID", information that can specify an entity that holds a ... signing key can suffice, and it may be simply modified to " ... ID" since it is not restricted to an ID of a ... signing key. For example, terms of a first apparatus signing key ID, a first apparatus manufacturer signing key ID, a first apparatus evaluating organization signing key ID, a template issuing organization signing key ID, a second apparatus signing key ID, a second apparatus manufacturer signing key ID, and a second apparatus evaluating organization signing key ID may be modified to a first apparatus ID, a first apparatus manufacturer ID, a first apparatus evaluating organization ID, a template issuing organization ID, a second apparatus ID, a second apparatus manufacturer ID, and a second apparatus evaluating organization ID, respectively. As the first apparatus ID or the second apparatus ID, for example, a model number or a serial number of an apparatus can be used, an apparatus is evaluated in accordance with each model number when the model number is adopted, and an apparatus is evaluated in accordance with each serial number when the serial number is adopted.

Here, the first manufacturer storage unit $1a$ is a storage apparatus that can read/write information from/into the second apparatus manufacturer $2a$, and it stores a first apparatus signing key ID, a first apparatus signing key, and first apparatus signature verifying information (the first apparatus signing key ID, a first apparatus public key (signature verifying information), a first apparatus manufacturer signing key ID, and a first apparatus manufacturer signature) which are associated with each other, and a first apparatus manufacturer signing key ID, a first apparatus manufacturer signing key, and first apparatus manufacturer signature verifying information (a first apparatus manufacturer public key) which are associated with each other. It is be noted that the first apparatus signature verifying information is information obtained by performing digital signature generation processing based on the first apparatus manufacturer signing key with respect to the first apparatus signing key ID, the first apparatus public key (the signature verifying information), and the first apparatus manufacturer signing key ID to generate a first apparatus manufacturer signature and adding this first apparatus manufacturer signature to the first apparatus signing key ID, the first apparatus public key (the signature verifying information), and the first apparatus manufacturer signing key ID. The first apparatus manufacturer signature verifying information is the first apparatus manufacturer public key associated with the first apparatus manufacturer signing key. Here, the validity of the first apparatus manufacturer signature verifying information can be verified by the verification apparatus 40. As a realizing method, a public key certificate issued by a reliable third party organization may be determined as the first apparatus manufacturer signature verifying information with respect to the first apparatus manufacturer signing key ID and the first apparatus manufacturer public key, or the first apparatus manufacturer signing key ID and the first apparatus manufacturer signature verifying information may be safely transmitted from the first apparatus manufacturer $2a$ to the verification apparatus 40. Here, the phrase "safely transmitted" means, e.g., mutual authentication and encrypted communication.

The first apparatus manufacturer $2a$ is a computer utilized by an apparatus manufacturer who manufactures/sells a first entity apparatus 10' and has the following respective functions, ($f2a$-1) and ($f2a$-2).

($f2a$-1) A function of issuing the first entity apparatus 10' having a first apparatus signing key and a first apparatus signing key ID in the first manufacturer storage unit $1a$ written therein.

(f2a-2) A function of writing first apparatus signature verifying information in the first manufacturer storage unit 1a and a first apparatus manufacturer signing key ID and a first apparatus manufacturer signature verifying information which are associated with each other into the first repository 6a. It is to be noted that a function of safely transmitting the first apparatus signature verifying information in the first manufacturer storage unit 1a and the first apparatus manufacturer signing key ID and the first apparatus manufacturer signature verifying information which are associated with each other to the verification apparatus 40 may be provided in place of this function (f2a-2).

The first apparatus evaluating organization 3a is a computer utilized by a third party organization (e.g., a public evaluating organization) that evaluates the first entity apparatus 10' issued by the first apparatus manufacturer 2a, and it has the following respective functions (f3a-1) to (f3a-5).

(f3a-1) A function of holding a first apparatus evaluating organization signing key ID, a first apparatus evaluating organization signing key, and first apparatus evaluation certificate verifying information (a first apparatus evaluating organization public key) which are associated with each other.

(f3a-2) A function of executing digital signature generation processing based on the first apparatus evaluating organization signing key with respect to the first apparatus signing key ID in the first entity apparatus 10', the apparatus evaluating information for the first entity apparatus 10', and the first apparatus evaluating organization signing key ID to generate a first apparatus evaluating organization signature.

(f3a-3) A function of adding this first apparatus evaluating organization signature to the first apparatus signing key ID, the apparatus evaluating information, and the first apparatus evaluating organization signing key ID to issue a first apparatus evaluation certificate.

(f3a-4) A function of writing this first apparatus evaluation certificate into the first entity apparatus 10' to issue a first entity apparatus 10".

(f3a-5) A function of writing the first apparatus evaluating organization signing key ID and the first apparatus evaluation certificate verifying information associated with each other into the first repository 6a. It is to be noted that the first apparatus evaluating organization 3a may include a function of safely transmitting the first apparatus evaluating organization signing key ID and the first apparatus evaluation certificate verifying information to the verification apparatus 40 in place of this function (3a-5). Here, the verification apparatus 40 can verify the validity of the first apparatus evaluation certificate verifying information. As a realization method, for example, a public key certificate issued by a reliable third party organization with respect to the first apparatus evaluating organization signing key ID and the first apparatus evaluating organization public key may be the first apparatus evaluation certificate verifying information, or the first apparatus evaluating organization signing key ID and the first apparatus evaluation signature verifying information may be safely transmitted from the first apparatus evaluating organization 3a to the verification apparatus 40. Additionally, the first apparatus evaluating organization 3a may write the first apparatus evaluation certificate into the first entity apparatus 10', or a third party may write the same into the first entity apparatus 10'.

On the other hand, the second manufacturer storage unit 1b is a storage apparatus that can read/write information from/into the second apparatus manufacturer 2b, and it stores a second apparatus signing key ID and a second apparatus signing key which are associated with each other, second apparatus signature verifying information (information including the second apparatus signing key ID, a second apparatus public key (signature verifying information), a second apparatus manufacturer signing key ID, and a second apparatus manufacturer signature), and a second apparatus manufacturer signing key ID, a second apparatus manufacturer signing key, and a second apparatus manufacturer verifying information (a second apparatus manufacturer public key) which are associated with each other. It is to be noted that the second apparatus signature verifying information is information obtained by performing digital signature generation processing based on the second apparatus manufacturer signing key with respect to the second apparatus signing key ID, the second apparatus public key (the signature verifying information), and the second apparatus manufacturer signing key ID to generate a second apparatus manufacturer signature and adding this second apparatus manufacturer signature to the second apparatus signing key ID, the second apparatus public key (the signature verifying information), and the second apparatus manufacturer signing key ID. It is to be noted that the second apparatus manufacturer signature verifying information is a second apparatus manufacturer public key associated with the second apparatus manufacturer signing key. Here, like the first apparatus manufacturer signature verifying information, the verification apparatus 40 can verify the validity of the second apparatus manufacturer signature verifying information.

The second apparatus manufacturer 2b is a computer that is used by an apparatus manufacturer who manufactures/sells a second entity apparatus 20', and it has the following respective functions (f2b-1) and (f2b-2).

(f2b-1) A function of issuing the second entity apparatus 20' having a second apparatus signing key and a second apparatus signing key ID in the second manufacturer storage unit 1b written therein.

(f2b-2) A function of writing second apparatus signature verifying information in the second manufacturer storage unit 1b and a second apparatus manufacturer signing key ID and second apparatus manufacturer signature verifying information which are associated with each other into the second repository 6b. It is to be noted that a function of safely transmitting the second apparatus signature verifying information in the second manufacturer storage unit 1b and the second apparatus manufacturer signing key ID and the second apparatus manufacturer signature verifying information which are associated with each other to the verification apparatus 40 may be provided in place of this function (f2b-2).

It is to be noted that the second apparatus manufacturer 2b may be the same as the first apparatus manufacturer 2a, and the second apparatus manufacturer signing key ID, the second apparatus signing key, and the second apparatus manufacturer signature verifying information may be the same as the first apparatus manufacturer signing key ID, the first apparatus signing key, and the first apparatus manufacturer signature verifying information when the second apparatus manufacturer 2b is the same as the first apparatus manufacturer 2a.

The second apparatus evaluating organization 3b is a computer used by a third party organization (e.g., a public evaluating organization) that evaluates a second entity apparatus 20' issued by the second apparatus manufacturer 2b, and it has the following respective functions (f3b-1) to (f3b-5).

(f3b-1) A function of holding a second apparatus evaluating organization signing key ID, a second apparatus evaluating organization signing key, and second apparatus evaluation certificate verifying information (a second apparatus evaluating organization public key) which are associated with each other.

(f3*b*-2) A function of executing digital signature generation processing based on a second apparatus evaluating organization signing key with respect to a second apparatus signing key ID in the second entity apparatus 20', apparatus evaluating information for the second entity apparatus 20', and a second apparatus evaluating organization signing key ID to generate a second apparatus evaluating organization signature.

(f3*b*-3) A function of adding this second apparatus evaluating organization signature to the second apparatus signing key ID, the apparatus evaluating information, and the second apparatus evaluating organization signing key ID to issue a second apparatus evaluation certificate.

(f3*b*-4) A function of writing this second apparatus evaluation certificate into the second entity apparatus 20' to issue the second entity apparatus 20.

(f3*b*-5) A function of writing a second apparatus evaluating organization signing key ID and second apparatus evaluation certificate verifying information which are associated with each other into the second repository 6*b*. It is to be noted that the second apparatus evaluating organization 3*b* may have a function of safely transmitting the second apparatus evaluating organization signing key ID and the second apparatus evaluation certificate verifying information to the verification apparatus 40 in place of this function (f3*b*-5). Here, like the first apparatus evaluation certificate verifying information, the verification apparatus 40 can verify the validity of the second apparatus evaluation certificate verifying information.

It is to be noted that the second apparatus evaluating organization 3*b* may be the same as the second apparatus evaluating organization 3*a*, and the second apparatus evaluating organization signing key ID, the second apparatus evaluating organization signing key, and the second apparatus evaluation certificate verifying information may be the same as the first apparatus evaluating organization signing key ID, the first apparatus evaluating organization signing key, and the first apparatus evaluation certificate verifying information when the second apparatus evaluating organization 3*b* is the same as the second apparatus evaluating organization 3*a*.

The issuing organization storage unit 4*a* is a storage apparatus that can read/write information from/into the template issuing organization 5*a*, and it has the following respective functions (f4*a*-1) and (f4*a*-2).

(f4*a*-1) A function of storing a template issuing organization signing key ID, a template issuing organization signing key, and template certificate verifying information (a template issuing organization public key) which are associated with each other.

(f4*a*-2) A function of storing a template and a template certificate issued by the template issuing organization 5*a*. Here, the verification apparatus 40 can verify the validity of the template certificate verifying information. As a realizing method, a public key certificate issued by a reliable third party organization with respect to the template issuing organization signing key ID and the template issuing organization public key may be determined as the template certificate verifying information, or the template issuing organization signing key ID and the template certificate verifying information may be safely transmitted from the template issuing organization 5*a* to the verification apparatus 40.

The template issuing organization 5*a* has the following respective functions (f5*a*-1) to (f5*a*-7).

(f5*a*-1) A function of acquiring and issuing a template (biometric reference information) of a user by using, e.g., a non-illustrated sensor apparatus based on an issuing request from the user.

(f5*a*-2) A function of generating a hash value of this template.

(f5*a*-3) A function of executing digital signature generation processing based on a template issuing organization signing key in the issuing organization storage unit 4*a* with respect to this hash value and the template issuing organization signing key ID in the issuing organization storage unit 4*a* to generate a template issuing organization signature.

(f5*a*-4) A function of adding this template issuing organization signature to the hash value of the template and the template issuing organization signing key ID to issue a template certificate.

(f5*a*-5) A function of writing the issued template and template certificate into the issuing organization storage unit 4*a*.

(f5*a*-6) A function of writing the issued template and template certificate into the first entity apparatus 10" to issue the first entity apparatus 10.

(f5*a*-7) A function of writing a template issuing organization signing key ID and template certificate verifying information which are associated with each other in the issuing organization storage unit 4*a* into the first repository 6*a*. It is to be noted that the template issuing organization 5*a* may have a function of safely transmitting the template issuing organization signing key ID and the template certificate verifying information to the verification apparatus 40 in place of this function (f5*a*-7).

The first repository 6*a* is a database apparatus which can read/write information from/into the first manufacturer apparatus 2*a*, the first apparatus evaluating organization 3*a*, and the template issuing apparatus 5*a* and can read information solely from the verification apparatus 40, and it has the following respective functions (f6*a*-1) to (f6*a*-3).

(f6*a*-1) A function of holding first apparatus signature verifying information written from the first apparatus manufacturer 2*a* and first apparatus manufacturer signing key ID and first apparatus manufacturer signature verifying information which are associated with each other and written from the first apparatus manufacturer 2*a*.

(f6*a*-2) A function of holding a first apparatus evaluating organization signing key ID and first apparatus evaluation certificate verifying information which are associated with each other and written from the first apparatus evaluating organization 3*a*.

(f6*a*-3) A function of holding a template issuing organization signing key ID and template certificate verifying information which are associated with each other and written from the template issuing organization 5*a*.

The second repository 6*b* is a database apparatus which can read/write information from/into the second manufacturer apparatus 2*b* and the second apparatus evaluating organization 3*b* after authentication and can read information solely from the verification apparatus 40, and it has the following respective functions (f6*b*-1) to (f6*b*-3).

(f6*b*-1) A function of holding second apparatus signature verifying information written from the second apparatus manufacturer 2*b* and a second apparatus manufacturer signing key ID and second apparatus manufacturer signature verifying information which are associated with each other and written from the second apparatus manufacturer 2*b*.

(f6*b*-2) A function of holding a second apparatus evaluating organization signing key ID and second apparatus evaluation certificate verifying information which are associated with each other and written from the second apparatus evaluating organization 3*b*. It is to be noted that the first and second repositories 6*a* and 6*b* may be realized by the same database apparatus.

The first entity apparatus 10 is an apparatus that executes an authentication configuring process for storing a template BT and outputting the same in response to a request, and an IC card or the like corresponds to this apparatus and is connected with the client apparatus 30 to be used.

Specifically, as shown in FIG. 3, the first entity apparatus 10 includes a key storage unit 11, a certificate information storage unit 12, a template storage unit 13, an authentication configuring process execution unit 14, an authentication context generation unit 15, and a control unit 16.

The key storage unit 11 is a storage apparatus into which information can be written by the first apparatus manufacturer 2a and from which information can be read by the authentication context generation unit 15, and stores a first apparatus signing key ID and a first apparatus signing key K1 written which are associated with each other and written from the first apparatus manufacturer 2a.

The certificate information storage unit 12 is a storage apparatus into which information can be written by the first apparatus evaluating organization 3a and the template issuing organization 5a and from which information can be read by the authentication context generation unit 15, and stores a first apparatus evaluation certificate Cert1 written from the first apparatus evaluating organization 3a and a template certificate CertBT written from the template issuing organization 5a.

The template storage unit 13 is a storage apparatus into which information can be written by the template issuing organization 5a and from which information can be read by the authentication configuring process execution unit 14, and stores a template BT written from the template issuing organization 5a.

The authentication configuring process execution unit 14 has a function of reading the template BT in the template storage unit 13 and transmitting the template BT to the control unit 16 upon accepting an authentication configuring process execution request from the control unit 16.

The authentication context generation unit 15 has the following respective functions (f15-1) to (f15-3).

(f15-1) A function of executing digital signature generation processing based on the first apparatus signing key K1 in the key storage unit 11 with respect to the first apparatus evaluation certificate Cert1 and the template certificate CertBT in the certificate information storage unit 12 and the first apparatus signing key ID in the key storage unit 11 to generate a first entity apparatus signature upon accepting an authentication context generation request and the template BT from the control unit 16.

(f15-2) A function of adding this first entity apparatus signature to the first apparatus evaluation certificate Cert1, the template certificate CertBT, and the first apparatus signing key ID to generate a first authentication context AC1.

(f15-3) A function of transmitting this first authentication context AC1 to the control unit 16.

The control unit 16 has the following respective functions (f16-1) to (f16-3).

(f16-1) A function of transmitting an authentication configuring process execution request to the authentication configuring process execution unit 14 upon receiving an authentication request from the client apparatus 30.

(f16-2) A function of transmitting the template BT and an authentication context generation request to the authentication context generation unit 15 upon receiving the template BT from the authentication configuring process execution unit 14.

(f16-3) A function of transmitting the first authentication context AC1 and the template BT to the client apparatus 30 upon receiving the first authentication context A1 from the authentication context generation unit 15.

Here, as shown in FIG. 4, the first authentication context AC1 is obtained by adding a first entity apparatus signature to the template certificate CertBT, the first apparatus evaluation certificate Cert1, and the first apparatus signing key ID. The first apparatus signing key ID is an ID that is utilized to identify the first entity apparatus 10 that has given a signature. The template certificate CertBT is obtained by adding a template issuing organization signature to a hash value of the template and the template issuing organization signing key ID. The template issuing organization signing key ID is an ID that is utilized to identify the template issuing organization signing key. The first apparatus evaluation certificate Cert1 is obtained by adding a first apparatus evaluating organization signature to the first apparatus signing key ID, the first apparatus evaluating information, and the first apparatus evaluating organization signing key ID. The first apparatus signing key ID is an ID that is utilized to identify the first apparatus signing key. The first apparatus evaluating information is information indicative of evaluation items and evaluation results of the first entity apparatus 10' provided by the first apparatus evaluating organization 3a, and indicates, e.g., evaluation for an accuracy of a configuring process executed by the apparatus or security strength of the apparatus. The first apparatus evaluating organization signing key ID is an ID that is utilized to identify a signing key of the first apparatus evaluating organization. Here, the first apparatus signing key ID of the first apparatus evaluation certificate Cert1 may be substituted by information that can specify the first entity apparatus 10. In this case, however, the first authentication context AC1 or first apparatus signature verifying information VfS1 includes information that can specify the first entity apparatus. Here, the first authentication context AC1 may further include an execution result of the authentication configuring process. That is, in this example, the output template BT as an execution result of the authentication configuring process or a hash value of the template BT may be included.

It is to be noted that the first entity apparatus 10 has a (tamper-resistant) function having resistance against attacks such as fraudulent reading or alteration of the template BT, the first apparatus signing key K1, etc. stored therein.

The second entity apparatus 20 is an apparatus that collates the template BT with actually input biometric information, and a fingerprint matching apparatus or the like corresponds to this apparatus, and this apparatus is connected with the client apparatus 30 to be used.

Specifically, as shown in FIG. 5, the second entity apparatus 20 includes a key storage unit 21, a certificate information storage unit 22, an authentication configuring process execution unit 23, an authentication context generation unit 24, and a control unit 25.

The key storage unit 21 is a storage apparatus into which information can be written by the second apparatus manufacturer 2b and from which information can be read by the authentication context generation unit 24, and stores a second apparatus signing key ID and a second apparatus signing key K2 which are associated with each other and written by the second apparatus manufacturer 2b.

The certificate information storage unit 22 is a storage apparatus into which information can be written by the second apparatus evaluating organization 3b and from which information can be read by the authentication context generation unit 24, and stores a second apparatus evaluation certificate Cert2 written from the second apparatus evaluating organization 3b.

The authentication configuring process execution unit 23 has a sensor 23S that measures biometric information from a user, and has a function of executing collation processing of the template BT and the biometric information measured by the sensor 23S upon receiving an authentication configuring process execution request and the template BT from the control unit 25, generating a hash value of the template BT, and transmitting a collation execution result (which will be also referred to as an authentication execution result hereinafter) including this hash value to the control unit 25. It is to be noted that the authentication execution result is not restricted to the hash value of the template BT as long as the authentication execution result is information that enables verifying an input for the biometric authentication processing and an output after the processing.

The authentication context generation unit 24 has the following respective functions (f24-1) to (f24-3).

(f24-1) A function of executing digital signature generation processing based on a second apparatus signing key K2 in the key storage unit 21 with respect to a second apparatus evaluation certificate Cert2 in the certificate information storage unit 22 and a second apparatus signing key ID in the key storage unit 21 to generate a second entity apparatus signature as a result of a collation execution result upon receiving an authentication context generation request and the collation execution result from the control unit 25.

(f24-2) A function of adding this second entity apparatus signature to the collation execution result, the second apparatus evaluation certificate Cert2, and the second apparatus signing key ID to generate a second authentication context AC2.

(f24-3) A function of transmitting this second authentication context AC2 to the control unit 25.

The control unit 25 has the following respective functions (f25-1) to (f25-3).

(f25-1) A function of transmitting an authentication configuring process execution request and the template BT to the authentication configuring process execution unit 23 upon receiving an authentication request and the template BT from the client apparatus 30.

(f25-2) A function of transmitting a collation exaction result and an authentication context generation request to the authentication context generation unit 24 upon receiving a collation execution result from the authentication configuring process execution unit 23.

(f25-3) A function of transmitting a second authentication context AC2 to the client apparatus 30 upon receiving the second authentication context AC2 from the authentication context generation unit 24.

Figure 6:
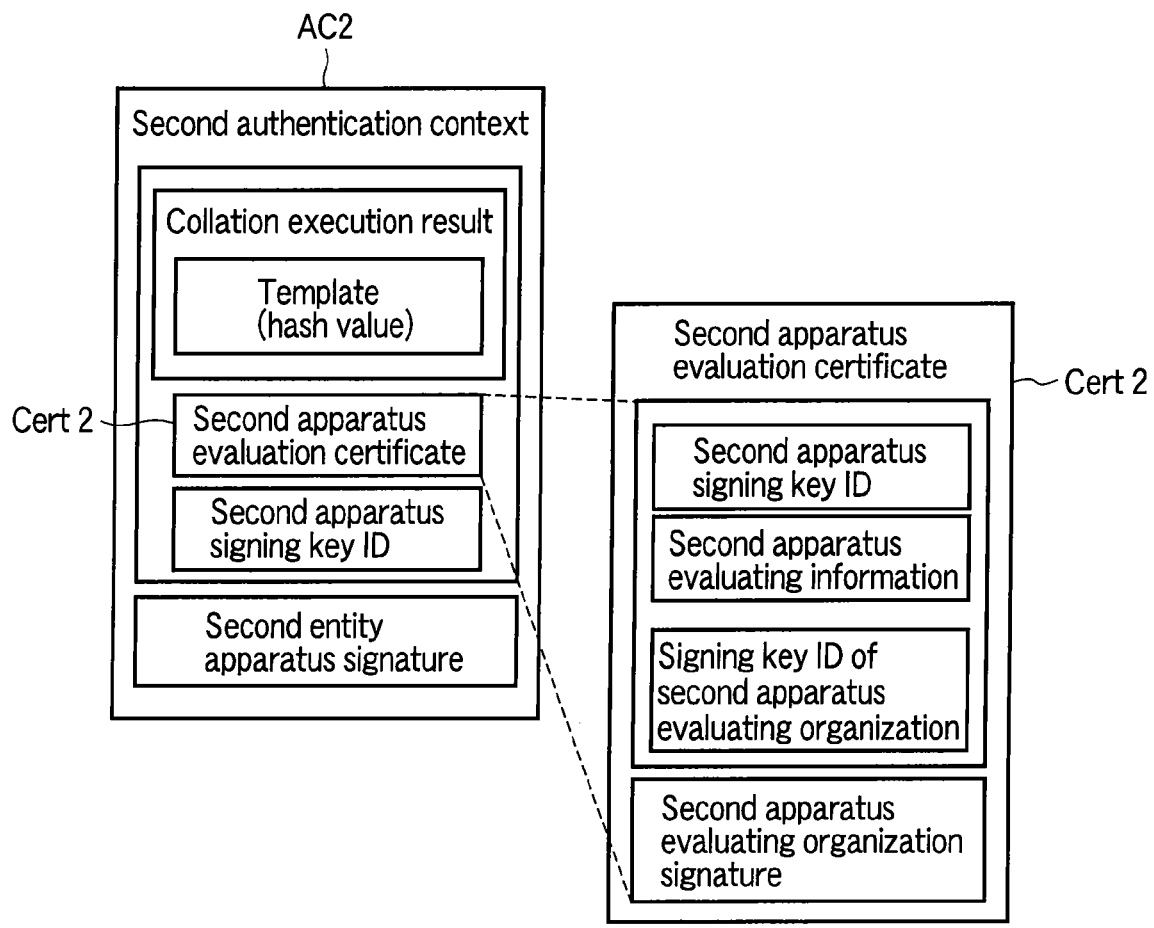
FIG. 6 is a schematic view showing a configuration of a second authentication context in the first embodiment.

Here, as shown in FIG. 6, the second authentication context AC2 is information obtained by adding the second entity apparatus signature to the collation execution result as an execution result of the authentication processing and information (e.g., a hash value) corresponding to the template used for the collation and to the second apparatus evaluation certificate Cert2 and the second apparatus signing key ID. The second apparatus signing key ID is an ID that is used for identifying the second entity apparatus 20 that has given the signature. The second apparatus evaluation certificate Cert2 is obtained by adding the second apparatus evaluating organization signature to the second apparatus signing key ID, the second apparatus evaluating information, and the second apparatus evaluating organization signing key ID. The second apparatus evaluating information is information indicative of evaluation items and evaluation results of the second entity apparatus 20' provided by the second apparatus evaluating organization 3b, and indicates evaluation for an accuracy of a configuring process executed by the apparatus or security strength of the apparatus. The second apparatus evaluating organization signing key ID is an ID that is used for identifying the second apparatus evaluating organization signing key. Here, the second apparatus signing key ID of the second apparatus evaluation certificate Cert2 may be substituted by information that enables specifying the second entity apparatus 20. In this case, however, the second authentication context AC2 or the second apparatus signature verifying information VfS2 includes information that enables specifying the second entity apparatus 20.

It is to be noted that the second entity apparatus 20 has a (tamper-resistant) function having resistance against attacks such as fraudulent reading or alteration of the stored second apparatus signing key K2 or the like or attack that fraudulently alters an execution result of the authentication configuring process, e.g., acquisition of biometric information or collation processing.

The client apparatus 30 corresponds to, e.g., a client PC utilized by a user, and is connected between the first and second entity apparatuses 10 and 20 and the verification apparatus 40.

Specifically, the client apparatus 30 includes a storage unit 31 and a control unit 32.

The storage unit 31 is a storage apparatus from/into which information can be read/written by the control unit 32, and stores, e.g., data transmitted/received between the first and second entity apparatuses 10 and 20 and the verification apparatus 32.

The control unit 32 has the following respective functions (f32-1) to (f32-4).

(f32-1) A function of transmitting an authentication request received from the verification apparatus 40 to the first entity apparatus 10.

(f32-2) A function of writing a first authentication context AC1 into the storage unit 31 upon receiving a template BT and the first authentication context AC1 from the first entity apparatus 10.

(f32-3) A function of transmitting the template BT and the authentication request to the second entity apparatus 20.

(f32-4) A function of transmitting first and second authentication contexts AC1 and AC2 to the verification apparatus 40 upon receiving the second authentication context AC2 from the second entity apparatus 20. Incidentally, when transmitting the template BT, it is desirable for the client apparatus 30 to transmit the template BT by using safe communication separately established between the first entity apparatus and the second entity apparatus.

Figure 7:
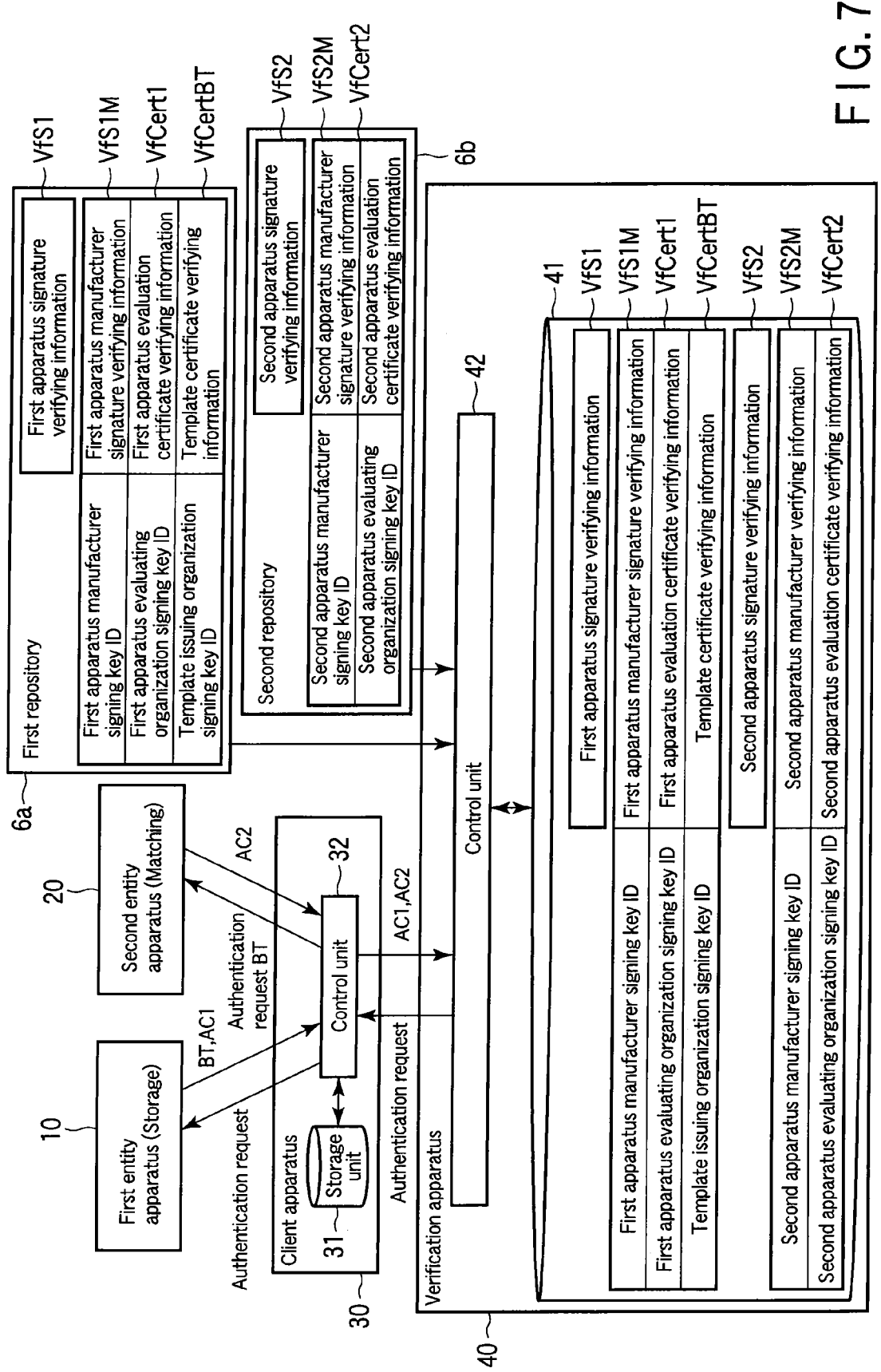
FIG. 7 is a schematic view showing a configuration of the verification apparatus in the first embodiment.
Figure 8:
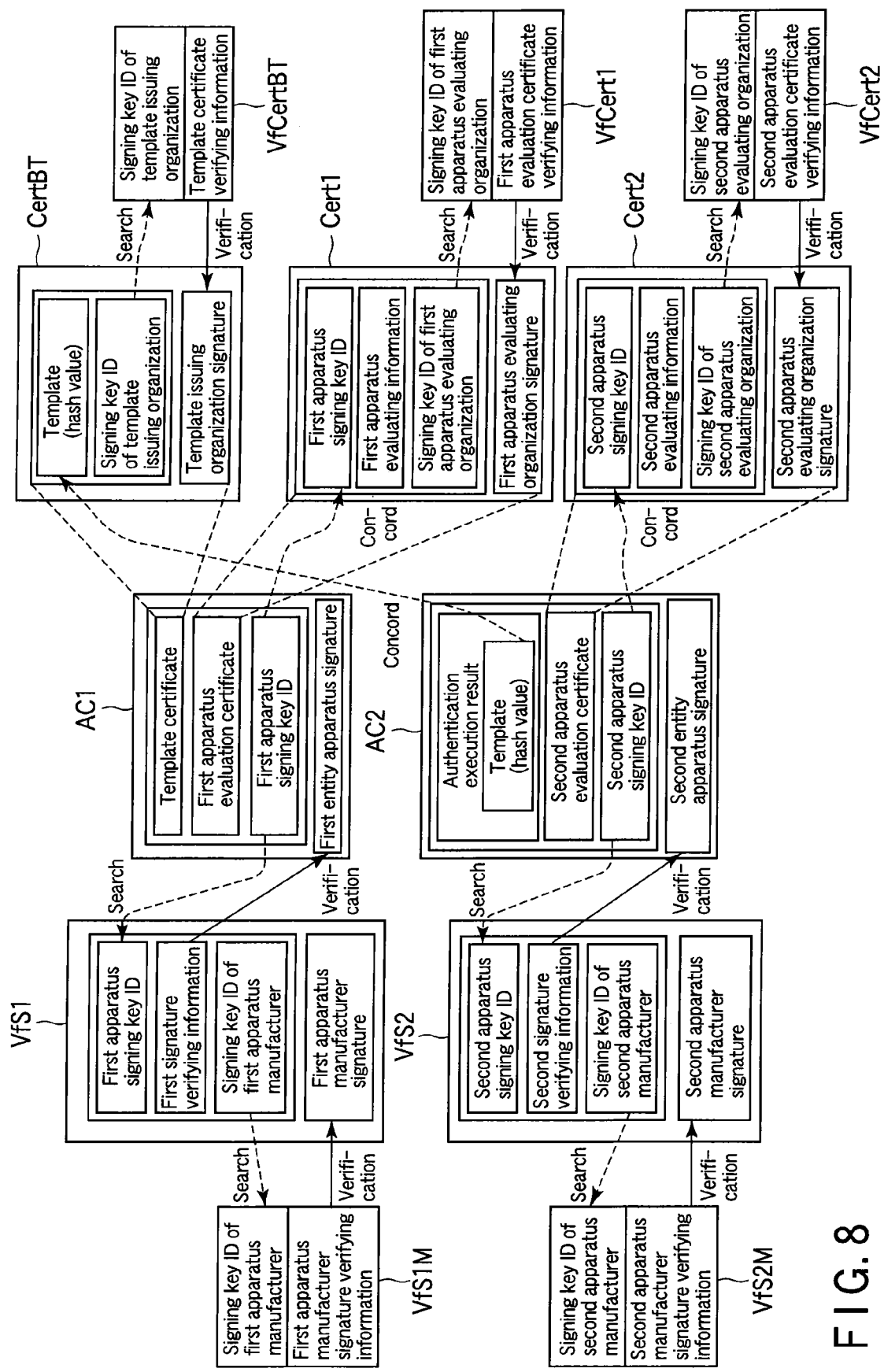
FIG. 8 is a schematic view for explaining a verifying operation in the first embodiment.

As shown in FIG. 7, the verification apparatus 40 includes a storage unit 41 and a control unit 41.

The storage unit 41 is a storage apparatus from/into which information can be read/written by the control unit 42, and stores, e.g., respective pieces of apparatus signature verifying information VfS1 and VfS2 acquired from the first and second repositories 6a and 6b by the control unit 42, respective signing key IDs and respective pieces of verifying information VfS1M, VfCert1, VfCertBT, VfS2M, and VfCert2 which are associated with each other. Specifically, the storage unit 41 stores the first apparatus signature verifying information VfS1, the first apparatus manufacturer signing key ID, the first apparatus manufacturer signature verifying information VfS1M, the first apparatus evaluating organization signing key ID, the first apparatus evaluation certificate verifying information VfCert1, the template issuing organization signing key ID, and the template certificate verifying information VfCertBT acquired from the first repository 6a. Further, the storage unit 41 stores the second apparatus signature verifying information VfS2, the second apparatus manufacturer signing key ID, the second apparatus manufacturer signature verifying information VfS2M, the second apparatus evaluating organization signing key ID, and the second apparatus evaluation certificate verifying information VfCert2 acquired from the second repository 6b.

The control unit 42 has the following respective functions (f42-1) to (f42-4).

(f42-1) A function of transmitting an authentication request to the client apparatus 30.

(f42-2) A function of acquiring respective pieces of apparatus signature verifying information VfS1 and VfS2 or the respective signing key IDs and respective pieces of verifying information VfS1M, VfCert1, VfCertBT, VfS2M, and VfCert2 which are associated with each other from the first and second repositories 6a and 6b to be written into the storage unit 41 based on first and second authentication contexts AC1 and AC2 received from the client apparatus 30.

(f42-3) A function of verifying the first and second authentication contexts AC1 and AC2 based on the respective pieces of verifying information in the storage unit 41.

(f42-4) A function of judging whether authentication is achieved based on apparatus evaluating information written in a first apparatus evaluation certificate in the first authentication context AC1, apparatus evaluating information written in a second apparatus evaluation certificate in the second authentication context AC2, and an authentication execution result in the second authentication context AC2 when the respective authentication contexts AC1 and AC2 are valid. Here, when acquiring the respective pieces of verifying information VfS1M, VfCert1, VfCertBT, VfS2M, and VfCert2 from the first and second repositories 6a and 6b to be written into the storage unit 41, the validity of the respective pieces of information is verified by using the above-described means, and writing is performed only when the verification is successful. It is to be noted that the respective pieces of apparatus signature verifying information VfS1 and VfS2 or the respective signing key IDs and the respective pieces of verifying information VfS1M, VfCert1, VfCertBT, VfS2M, and VfCert2 may be acquired from the first and second repositories 6a and 6b to be written into the storage unit 41 in advance. Additionally, in this case, the validity of the respective pieces of verifying information VfS1M, VfCert1, VfCertBT, VfS2M, and VfCert2 may be verified by using the above-described means in advance. Further, the validity of the first apparatus signature verifying information VfS1 may be verified in advance by verifying the first apparatus manufacturer signature in the first apparatus signature verifying information based on the first apparatus manufacturer signature verifying information VfS1M associated with the first apparatus manufacturer signing key ID in this first apparatus signature verifying information VfS1. As a result, it is possible to confirm that the first apparatus signature verifying information VfS1 has been created by the first apparatus manufacturer 2a. Likewise, the validity of the second apparatus signature verifying information VfS2 may be verified in advance by verifying the second apparatus manufacturer signature in the second apparatus signature verifying information VfS2 based on the second apparatus manufacturer signature verifying information VfS2M associated with the second apparatus manufacturer signing key ID in this second apparatus signature verifying information VfS2M. As a result, it is possible to confirm that the second apparatus signature verifying information VfS2 has been created by the second apparatus manufacturer 2b.

Here, as functions of verifying the first and second authentication contexts AC1 and AC2, there are the following functions (VfAC-1) to (VfAC-10), and they can be executed in an arbitrary order, but all authenticating functions (VfAC-1) to (VfAC-10) must succeed.

(VfAC-1) A function of searching the storage unit 41 by using the first apparatus signing key ID in the first authentication context AC1 to verify a first entity apparatus signature in the first authentication context AC1 based on the first apparatus signature verifying information VfS1 associated with the first apparatus signing key ID in the storage unit 41. As a result, it is confirmed that the first authentication context AC1 has been created by the first entity apparatus 10.

(VfAC-2) A function of searching the storage unit 41 by using the first apparatus signing key ID in the first authentication context AC1 to read the first apparatus signature verifying information VfS1 having the first apparatus signing key ID from the storage unit 41, searching the storage unit 41 by using the first apparatus manufacturer signing key ID in this first apparatus signature verifying information VfS1, and verifying a first apparatus manufacturer signature in the first apparatus signature verifying information VfS1 based on the first apparatus manufacturer signature verifying information VfS1M associated with the first apparatus manufacturer signing key ID in the storage unit 41. As a result, it is confirmed that the first apparatus signature verifying information VfS1 has been created by the first apparatus manufacturer 2a. It is to be noted that, as explained above, when the first apparatus manufacturer signature in the first apparatus signature verifying information VfS1 is verified in advance, execution of this function can be omitted at the time of verifying the first authentication context AC1.

(VfAC-3) A function of verifying that the first apparatus signing key ID in the first authentication context AC1 coincides with the first apparatus signing key ID in the first apparatus evaluation certificate Cert1 of the first authentication context AC1. As a result, it is confirmed that the first apparatus evaluation certificate Cert1 belongs to an apparatus that has created the first authentication context AC1 (the first entity apparatus 10).

(VfAC-4) A function of searching the storage unit 41 by using the first apparatus evaluating organization signing key ID in the first apparatus evaluation certificate Cert1 and verifying a first apparatus evaluating organization signature in the first apparatus evaluation certificate Cert1 based on first apparatus evaluating organization verifying information VfCert1 associated with the first apparatus evaluating organization signing key ID in the storage unit 41. As a result, it is confirmed that the first apparatus evaluation certificate Cert1 has been created by the first apparatus evaluating organization 3a.

(VfAC-5) A function of searching the storage unit 41 by using the template issuing organization signing key ID in the template certificate CertBT of the first authentication context AC1 and verifying a template issuing organization signature in the template certificate Cert1 based on the template issuing organization verifying information VfCertBT associated with the template issuing organization signing key ID in the storage unit 41. As a result, it is confirmed that the template certificate CertBT has been created by the template issuing organization 5a.

(VfAC-6) A function of searching the storage unit 41 by using the second apparatus signing key ID in the second authentication context AC2 and verifying a second entity apparatus signature in the second authentication context AC2 based on the second apparatus signature verifying information VfS2 associated with the second apparatus signing key ID in the storage unit 41. As a result, it is confirmed that the second authentication context AC2 has been created by the second entity apparatus 20.

(VfAC-7) A function of searching the storage unit 41 by using the second apparatus signing key ID in the second authentication context AC2 to read the second apparatus signature verifying information VfS2 having the second apparatus signing key ID from the storage unit 41, searching the storage unit 41 by using the second apparatus manufacturer signing key ID in this second apparatus signature verifying information VfS2, and verifying a second apparatus manufacturer signature in the second apparatus signature verifying information VfS2 based on the second apparatus manufacturer signature verifying information VfS2M associated with the second apparatus manufacturer signing key ID in the storage unit 41. As a result, it is confirmed that the second apparatus signature verifying information VfS2 has been created by the second apparatus manufacturer 2b. It is to be noted that, as explained above, when the second apparatus manufacturer signature in the second apparatus signature verifying information VfS2 is verified in advance, execution of this function can be omitted at the time of verifying the second authentication context AC2.

(VfAC-8) A function of verifying that the second apparatus signing key ID in the second authentication context AC2 coincides with the second apparatus signing key ID in the second apparatus evaluation certificate Cert2 of the second authentication context AC2. As a result, it is confirmed that the second apparatus evaluation certificate Cert2 belongs to an apparatus that has created the second authentication context AC2 (the second entity apparatus 20).

(VfAC-9) A function of searching the storage unit 41 by using the second apparatus evaluating organization signing key ID in the second apparatus evaluation certificate Cert2 and verifying a second apparatus evaluating organization signature in the second apparatus evaluation certificate Cert2 based on the second apparatus evaluating organization verifying information VfCert2 associated with the second apparatus evaluating organization signing key ID in the storage unit 41. As a result, it is confirmed that the second apparatus evaluation certificate Cert2 has been created by the second apparatus evaluating organization 3b.

(VfAC-10) A function of verifying that a hash value of a template in the second authentication context AC2 coincides with a hash value of a template in the template certificate CertBT of the first authentication context AC1. As a result, it is confirmed that the template BT used for the collation processing in the second entity apparatus 20 is the template BT in the first entity apparatus 10.

Operations of the thus configured biometric authentication system will now be described.

(Preparation: FIG. 1 and Others)

The first apparatus manufacturer 2a issues the first entity apparatus 10' having a first apparatus signing key and a first apparatus signing key ID in the first manufacturer storage unit 1a written therein. Further, the first apparatus manufacturer 2a writes first apparatus signature verifying information in the first manufacturer storage unit 1a and a first apparatus manufacturer signing key ID and first apparatus manufacturer signature verifying information which are associated with each other into the first repository 6a. Here, the first apparatus signing key is a signing key that is used for guaranteeing that the first apparatus manufacturer 2a has manufactured and issued the first entity apparatus 10'. The first apparatus manufacturer 2a conceals the first apparatus signing key and prevents the first apparatus signing key from being written into apparatuses other than the first entity apparatus 10'.

It is assumed that the first apparatus evaluating organization having the first apparatus evaluating organization 3a has executed based on an evaluation request the apparatus evaluation with respect to the first entity apparatus 10' transmitted together with the evaluation request from the first apparatus manufacturer 2a and has input apparatus evaluating information to the first apparatus evaluating organization 3a by an operation of an operator. Here, the apparatus evaluating information is information indicative of the evaluation for an accuracy of a configuring process executed by the apparatus or security strength of the apparatus. The accuracy of the configuring process is, e.g., a resolution of a sensor when acquiring biometric information, a type of an algorithm for performing collation processing, a value of a false rejection rate or a false acceptance rate based on judgment processing, or a value obtained by leveling each of these rates. Moreover, the security strength of the apparatus is a value concerning a tamper-resistant level against attack such as fraudulent reading or alteration of a stored template or signing key or attack such as alteration of execution contents of an authentication configuring process.

Thereafter, the first apparatus evaluating organization 3a executes digital signature generation processing based on a signing key of the first apparatus evaluating organization with respect to the first apparatus signing key ID in the first entity apparatus 10', the apparatus evaluating information for the first entity apparatus 10', and a first apparatus evaluating organization signing key ID to generate a first apparatus evaluating organization signature.

Additionally, the first apparatus evaluating organization 3a adds this first apparatus evaluating organization signature to the first apparatus signing key ID, the apparatus evaluating information, and the first apparatus evaluating organization signing key ID to issue a first apparatus evaluation certificate, and it writes this first apparatus evaluation certificate into the first entity apparatus 10' to issue a first entity apparatus 10". Finally, the first apparatus evaluating organization 3a writes the first apparatus evaluating organization signing key ID and the first apparatus evaluation certificate verifying information which are associated with each other into the first repository 6a. Here, the first apparatus evaluation certificate is information that is used for guaranteeing that the first apparatus evaluating organization 3a is definitely the first entity apparatus suitable for the apparatus evaluating information, and the validity thereof can be verified by using the first apparatus evaluation certificate verifying information.

On the other hand, the second apparatus manufacturer 2b issues the second entity apparatus 20' having a second apparatus signing key and a second apparatus signing key ID in the second manufacturer storage unit 1b written therein. Further, the second apparatus manufacturer 2b writes second apparatus signature verifying information in the second manufacturer storage unit 1b and a second apparatus manufacturer signing key ID and second apparatus manufacturer signature verifying information which are associated with each other into the second repository 6b. Here, the second apparatus signing key is a signing key that is used for guaranteeing that the second apparatus manufacturer 2b has manufactured and issued the second entity apparatus 20'. The second apparatus manufacturer 2b conceals the second apparatus signing key and prevents the second apparatus signing key from being written into apparatuses other than the second entity apparatus 20'.

It is assumed that the second apparatus evaluating organization having the second apparatus evaluating organization 3b has executed apparatus evaluation based on an evaluation request with respect to the second entity apparatus 20' transmitted together with the evaluation request from the second apparatus manufacturer 2b and has input apparatus evaluating information to the second apparatus evaluating organization 3b by an operation of an operator.

Then, the second apparatus evaluating organization 3b executes digital signature generation processing based on a signing key of the second apparatus evaluating organization with respect to the second apparatus signing key ID in the second entity apparatus 20', the apparatus evaluating information for the second entity apparatus 20', and the second apparatus evaluating organization signing key ID, thereby generating a second apparatus evaluating organization signature.

Furthermore, the second apparatus evaluating organization 3b adds this second apparatus evaluating organization signature to the second apparatus signing key ID, the apparatus evaluating information, and the second apparatus evaluating organization signing key ID to issue a second apparatus evaluation certificate, and writes this second apparatus evaluation certificate into the second entity apparatus 20' to issue the second entity apparatus 20. Finally, the second apparatus evaluating organization 3b writes the second apparatus evaluating organization signing key ID and the second apparatus evaluation certificate verifying information which are associated with each other into the second repository 6b. Here, the second apparatus evaluation certificate is information that is used for guaranteeing the second entity apparatus suitable for the apparatus evaluating information by the second apparatus evaluating organization 3b, and the validity thereof can be verified by using the second apparatus evaluation certificate verifying information.

Then, the template issuing organization 5a samples and issues a template (biometric reference information) of a user by using, e.g., a non-illustrated sensor apparatus based on an issuing request from the user, thereby generating a hash value of this template. The template issuing organization 5a executes digital signature generation processing based on a template issuing organization signing key in the issuing organization storage unit 4a with respect to this hash value and a template issuing organization signing key ID in the issuing organization storage unit 4a to generate a template issuing organization signature. The template issuing organization 5a adds this template issuing organization signature to the hash value of the template and the template issuing organization signing key ID to issue a template certificate. The template issuing organization 5a writes the issued template and template certificate into the issuing organization storage unit 4a. Here, the template certificate is information that is used for guaranteeing the template definitely admitted by the template issuing organization 5a. For example, it is information that securely guarantees a depositor of a bank when the bank issues a template for the depositor. In particular, when the template issuing organization 5a confirms a principal by, e.g., an in-person method and then issues a template, it is also information that surely guarantees the principal.

The template issuing organization 3b writes the issued template and template certificate into the first entity apparatus 10" to issue the first entity apparatus 10, and writes the template issuing organization signing key ID and the template certificate verifying information which are associated with each other in the issuing organization storage unit 4a into the first repository 6a.

As a result, the first repository 6a holds the first apparatus signature verifying information, the first apparatus manufacturer signing key ID and the first apparatus manufacturer signature verifying formation which are associated with each other, the first apparatus evaluating organization signing key ID and the first apparatus evaluation certificate verifying information which are associated with each other, and the template issuing organization signing key ID and the template certificate verifying information which are associated with each other.

The second repository 6b holds the second apparatus signature verifying information, the second apparatus manufacturer signing key ID and the second apparatus manufacturer signature verifying information which are associated with each other, and the second apparatus evaluating organization signing key ID and the second apparatus evaluation certificate verifying information which are associated with each other.

(Verification: FIGS. 3 to 8, etc.)

When the client apparatus 30 accepts an authentication request from the verification apparatus 40, the client apparatus 30 transmits this authentication request to the first entity apparatus 10.

In the first entity apparatus 10, the control unit 16 transmits an authentication configuring process execution request to the authentication configuring process execution unit 14 upon accepting this authentication request, and transmits a template BT and an authentication context generation request to the authentication context generation unit 15 upon receiving the template BT from the authentication configuring process execution unit 14.

When the authentication context generation unit 15 accepts the authentication context generation request and the template BT, the authentication context generation unit 15 executes digital signature generation processing based on a first apparatus signing key K1 in the key storage unit 11 with respect to a first apparatus evaluation certificate Cert1 and a template certificate CertBT in the certificate information storage unit 12 and a first apparatus signing key ID in the key storage unit 11, thereby generating a first entity apparatus signature.

The authentication context generation unit 15 adds this first entity apparatus signature to the first apparatus evaluation certificate Cert1, the template certificate CertBT, and the first apparatus signing key ID to generate a first authentication context AC1, and transmits this first authentication context AC1 to the control unit 16.

In the first entity apparatus 10, the control unit 16 transmits the first authentication context AC1 and the template BT to the client apparatus 30.

When the client apparatus 30 accepts the template BT and the first authentication context AC1, client apparatus 30 writes the first authentication context AC1 into the storage unit 31 and transmits the template BT and an authentication request to the second entity apparatus 20.

In the second entity apparatus 20, upon receiving the authentication request and the template Bt, the control unit 25 transmits an authentication configuring process execution request and the template BT to the authentication configuring process execution unit 23. When the control unit 25 receives a collation execution result from the authentication configuring process execution unit 23, the control unit 25 transmits this collation execution result and an authentication context generation request to the authentication context generation unit 24.

When the authentication context generation unit 24 receives the authentication context generation request and the collation execution result, the authentication context generation unit 24 executes digital signature generation processing based on a second apparatus signing key K2 in the key storage unit 21 with respect to this collation execution result second apparatus evaluation certificate Cert2 in the certificate information storage unit 22 and a second apparatus signing key ID in the key storage unit 21, thereby generating a second entity apparatus signature.

Furthermore, the authentication context generation unit 24 adds this second entity apparatus signature to the collation execution result, the second apparatus evaluation certificate Cert2, and the second apparatus signing key ID to generate a second authentication context AC2, and transmits this second authentication context AC2 to the control unit 25.

In the second entity apparatus 20, the control unit 25 transmits this second authentication context AC2 to the client apparatus 30.

When the client apparatus 30 receives the second authentication context AC2 from the second entity apparatus 20, it transmits the first and second authentication contexts AC1 and AC2 to the verification apparatus 40.

When the verification apparatus 40 receives the first and second authentication contexts AC1 and AC2, the control unit 42 acquires respective pieces of apparatus signature verifying information VfS1 and VfS2 or respective signing key IDs and respective pieces of verifying information VfS1M, VfCert1, VfCertBT, VfS2M, and VfCert2 which are associated with each other from the first and second repositories 6a and 6b based on the first and second authentication contexts AC1 and AC2, and writes them into the storage unit 41.

Then, in the verification apparatus 40, the control unit 42 verifies the first and second authentication contexts AC1 and AC2 based on the respective pieces of verifying information in the storage unit 41.

Specifically, the control unit 42 searches the storage unit 41 by using a first apparatus signing key ID in the first authentication context AC1 and verifies a first entity apparatus signature in the first authentication context AC1 based on the first apparatus signature verifying information VfS1 associated with the first apparatus signing key ID in the storage unit 41.

Moreover, the control unit 42 searches the storage unit 41 by using the first apparatus signing key ID in the first authentication context AC1 to read the first apparatus signature verifying information VfS1 having the first apparatus signing key ID from the storage unit 41. The control unit 42 searches the storage unit 41 by using the first apparatus manufacturer signing key ID in this first apparatus signature verifying information VfS1 and verifies a first apparatus manufacturer signature in the first apparatus signature verifying information VfS1 based on the first apparatus manufacturer signature verifying information VfS1M associated with the first apparatus manufacturer signing key ID in the storage unit 41.

Additionally, the control unit 42 verifies that the first apparatus signing key ID in the first authentication context AC1 coincides with the first apparatus signing key ID in the first apparatus evaluation certificate Cert1 of the first authentication context AC1.

Further, the control unit 42 searches the storage unit 41 based on a first apparatus evaluating organization signing key ID in the first apparatus evaluation certificate Cert1 and verifies a first apparatus evaluating organization signature in the first apparatus evaluation certificate Cert1 based on first apparatus evaluating organization verifying information VfCert1 associated with the first apparatus evaluating organization signing key ID in the storage unit 41.

Furthermore, the control unit 42 searches the storage unit 41 by using a template issuing organization signing key ID in the template certificate CertBT in the first authentication context AC1 and verifies a template issuing organization signature in the template certificate Cert1 based on template issuing organization verifying information VfCertBT associated with the template issuing organization signing key ID in the storage unit 41.

Moreover, the control unit 42 searches the storage unit 41 by using a second apparatus signing key ID in the second authentication context AC2 and verifies a second entity apparatus signature in the second authentication context AC2 based on second apparatus signature verifying information VfS2 associated with the second apparatus signing key ID in the storage unit 41.

Additionally, the control unit 42 searches the storage unit 41 by using a second apparatus signing key ID in the second authentication context AC2 to read second apparatus signature verifying information VfS2 having the second apparatus signing key ID from the storage unit 41. The control unit 42 searches the storage unit 41 by using a second apparatus manufacturer signing key ID in this second apparatus signature verifying information VfS2 and verifies a second apparatus manufacturer signature in the second apparatus signature verifying information VfS2 based on second apparatus manufacturer signature verifying information VfS2M associated with the second apparatus manufacturer signing key ID in the storage unit 41.

Further, the control unit 42 verifies that the second apparatus signing key ID in the second authentication context AC2 coincides with the second apparatus signing key ID in the second apparatus evaluation certificate Cert2 of the second authentication context AC2.

Furthermore, the control unit 42 searches the storage unit 41 by using a second apparatus evaluating organization signing key ID in the second apparatus evaluation certificate Cert2 and verifies a second apparatus evaluating organization signature in the second apparatus evaluation certificate Cert2 based on second apparatus evaluating organization verifying information VfCert2 associated with the second apparatus evaluating organization signing key ID in the storage unit 41.

Moreover, it is verified that a hash value of a template in the second authentication context AC2 coincides with a hash value of a template in a template certificate CertBT of the first authentication context AC1.

The orders of the verifications or the confirmation processing may be appropriately changed. When all the verifications and confirmations have consequently succeeded, the verification apparatus 40 determines that the authentication has been executed in an appropriate environment. As a result, a verifier can verify whether the template or the apparatus evaluating information having the authentication context written therein has been issued by a proper apparatus evaluating organization that has performed evaluation.

Additionally, when the authentication context has been successfully verified, i.e., when each of the authentication contexts AC1 and AC2 is valid, the verification apparatus 40 judges whether the authentication is successful based on apparatus evaluating information written in the first apparatus evaluation certificate in the first authentication context AC1, apparatus evaluating information written in the second apparatus evaluation certificate in the second authentication context AC2, and an authentication execution result in the second authentication context AC2. Specifically, for example, whether an accuracy or security strength described in each apparatus evaluating information or an authentication execution result reaches predetermined authentication success criteria is judged, and the authentication is determined to be successful when such an item reaches the criteria, or the authentication is determined to be unsuccessful when the same reaches the criteria.

As explained above, according to this embodiment, the first authentication context AC1 includes the template certificate CertBT indicative of the validity of the template BT and the first apparatus evaluation certificate Cert1 indicative of the validity of the first apparatus evaluating information, the second authentication context AC2 includes the second apparatus evaluation certificate Cert2 indicative of the validity of the second apparatus evaluating information, and the template certificate BT and the first and second evaluation certificates Cert1 and Cert2 are verified when verifying the first and second authentication contexts AC1 and AC2, thereby verifying the validity of the template used for the authentication or the apparatus evaluating information included in the authentication context.

Further, when the first entity apparatus signature in the first authentication context AC1 is verified, it is possible to confirm that the first authentication context AC1 has been created by the first entity apparatus 10.

Furthermore, when the first apparatus manufacturer signature in the first apparatus signature verifying information VfS1 is verified, it is possible to confirm that the first apparatus signature verifying information VfS1 has been created by the first apparatus manufacturer 2a.

Moreover, when the coincidence of first apparatus signing key ID in the first authentication context AC1 and the first apparatus signing key ID in the first apparatus evaluation certificate Cert1 of the first authentication context AC1 is verified, it is possible to confirm that the first apparatus evaluation certificate Cert1 belongs to the apparatus that has created the first authentication context AC1 (the first entity apparatus 10).

Additionally, when the first apparatus evaluating organization signature in the first apparatus evaluation certificate Cert1 is verified, it is possible to confirm that the first apparatus evaluation certificate Cert1 has been created by the first apparatus evaluating organization 3a.

Further, when the template issuing organization signature in the template certificate Cert1 is verified, it is possible to confirm that the template certificate CertBT has been created by the template issuing organization 5a.

Furthermore, when the second entity apparatus signature in the second authentication context AC2 is verified, it is possible to confirm that the second authentication context AC2 has been created by the second entity apparatus 20.

Moreover, when the second apparatus manufacturer signature in the second apparatus signature verifying information VfS2 is verified, it is possible to confirm that the second apparatus signature verifying information VfS2 has been created by the second apparatus manufacturer 2b.

Additionally, verifying the coincidence of the second apparatus signing key ID in the second authentication context AC2 and the second apparatus signing key ID in the second apparatus evaluation certificate Cert2 of the second authentication context AC2 enables confirming that the second apparatus evaluation certificate Cert2 belongs to the apparatus that has created the second authentication context AC2 (the second entity apparatus 20).

Further, verifying the second apparatus evaluating organization signature in the second apparatus evaluation certificate Cert2 enables confirming that the second apparatus evaluation certificate Cert2 has been created by the second apparatus evaluating organization 3b.

Furthermore, verifying the coincidence of a hash value of the template in the second authentication context AC2 and a hash value of the template in the template certificate CertBT of the first authentication context AC1 enables confirming that the template BT used for the collation processing in the second entity apparatus 20 is the template BT in the first entity apparatus 10.

It is to be noted that this embodiment refers to an apparatus which verifies a result of the biometric authentication processing executed by the combination (an STOC model) of the first entity apparatus 10 which executes the authentication configuring process for holding the template BT and outputting it in response to a request, and the second entity apparatus 20 which executes the authentication configuring process for collating the template BT output from the first entity apparatus 10 with actually input biometric information, but the same apparatus can be used for verifying a result of the biometric authentication processing executed by a combination of any other authentication configuring process and the apparatus. For example, in an MOC model, since the first entity apparatus (e.g., an IC card) does not output a template, the authentication context A2 does not include a template hash value, but the authentication context A1 includes a result of the collation processing. Therefore, when verifying the first and second authentication contexts, executing the verification of (VfAC-1) to (VfAC-9) excluding (VfAC-10) can suffice. Further, in an SOC model, since the first entity apparatus (e.g., an IC card) executes all pieces of biometric authentication processing, the authentication context A1 alone is supplied to the verification apparatus. To verify this authentication context A1, executing the verification of relevant (VfAC-1) to (VfAC-5) alone can suffice. Furthermore, a multi-modal model is a model including a plurality of first entity apparatuses. For example, when two first entity apparatuses are provided, it is sufficient to verify (VfAC-1) to (VfAC-5) with respect to each of output authentication contexts A1 and A1', verify (VfAC-6) to (VfAC-9) with respect to an authentication context A2, and execute (VfAC-10) with respect to each of a combination of A1 and A2 and a combination of A1' and A2. Finally, in the case of a server collation model, executing the verification of (VfAC-1) to (VfAC-9) excluding (VfAC-10) with respect to the authentication contexts A1 and A2 can suffice like the MOC model.

Second Embodiment

Figure 10:
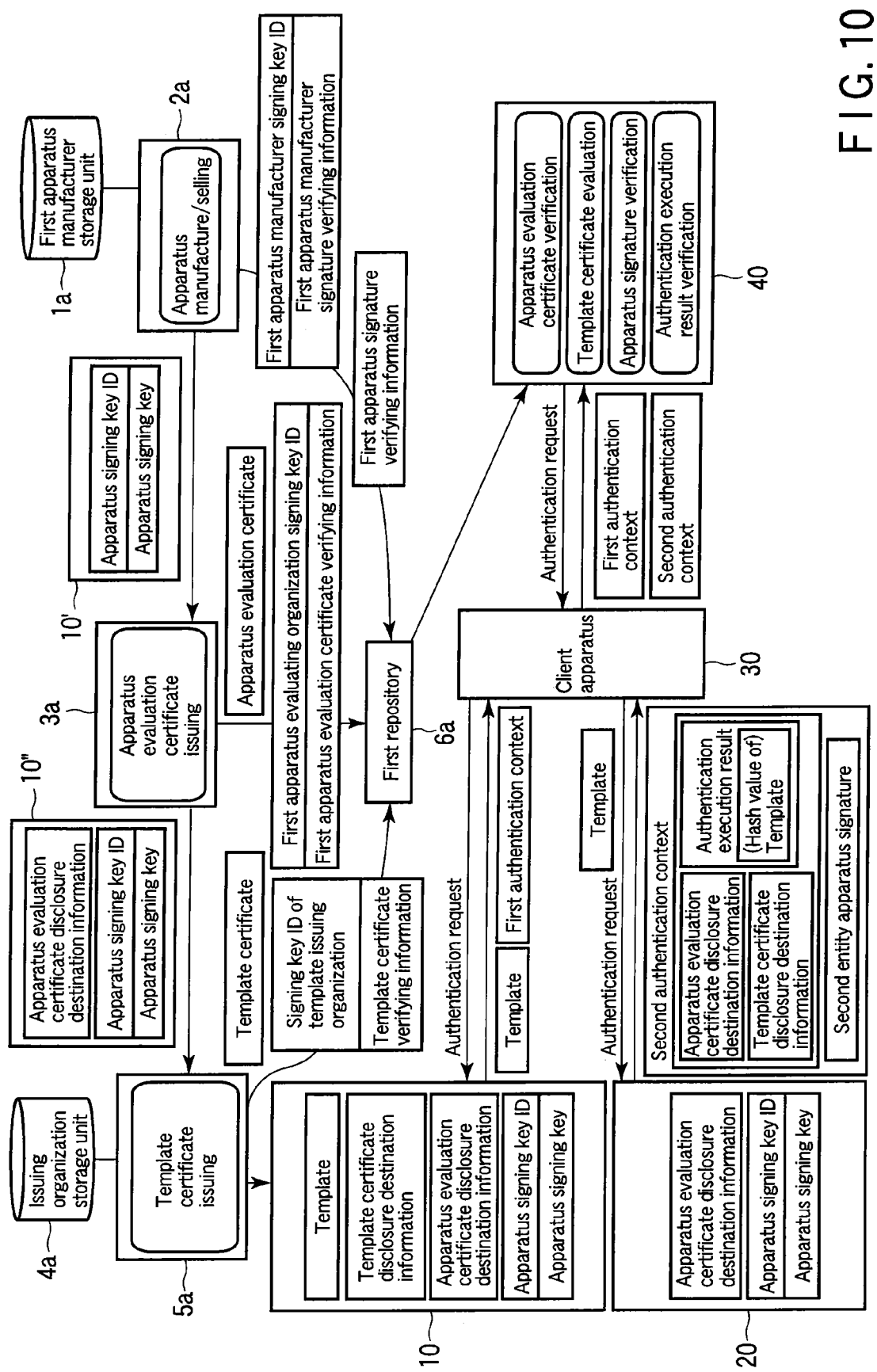
FIG. 10 is a schematic view showing a configuration of a part of the biometric authentication system in the second embodiment.

Each of FIGS. 1 and 10 is a schematic view showing a structural example of a biometric authentication system to which a verification apparatus according to a second embodiment is applied.

This embodiment is a modification of the first embodiment, in which template certificate disclosure destination information and first apparatus evaluation certificate disclosure destination information indicative of a template certificate CertBT and first apparatus evaluation certificate Cert1 in a first repository 6a are stored in a first entity apparatus 10 in place of the template certificate CertBT and the first apparatus evaluation certificate Cert1 in the first entity apparatus 10, and the template certificate CertBT and the first apparatus evaluation certificate Cert1 are stored in the first repository 6a.

Moreover, likewise, second apparatus evaluation certificate disclosure destination information indicative of a second apparatus evaluation certificate Cert2 in a second repository 6b is stored in a second entity apparatus 20 in place of the second apparatus evaluation certificate Cert2 in the second entity apparatus 20, and a second apparatus evaluation certificate Cert2 is stored in the second repository 6b.

With this configuration, the respective elements 3a, 3b, 4a, 4b, 5a, 5b, 6a, 6b, 12, 15, 22, 24, and 42 are modified as follows.

The first apparatus evaluating organization 3a has a function of holding first apparatus evaluation certificate disclosure destination information, a function of writing the first apparatus evaluation certificate disclosure destination information into a first entity apparatus 10' to issue a first entity apparatus 10", and a function of writing a first apparatus evaluation certificate into the first repository 6a in place of the function of writing the first apparatus evaluation certificate into the first entity apparatus 10" to issue the first entity apparatus 10" in the above-described functions. As the first apparatus evaluation certificate disclosure destination information, a URI (uniform resource identifier) indicating the first apparatus evaluation certificate in the first repository 6a can be used, for example.

The second apparatus evaluating organization 3b has a function of holding second evaluation certificate disclosure destination information, a function of writing the second apparatus evaluation certificate disclosure destination information into a second entity apparatus 20 to issue the second entity apparatus 20, and a function of writing the second apparatus evaluation certificate disclosure destination information into the second repository 6b in place of the function of writing a second apparatus evaluation certificate into a second entity apparatus 20' to issue the second entity apparatus 20 in the above-described functions. As the second apparatus evaluation certificate disclosure destination information, a URI (a uniform resource identifier) indicating the first apparatus evaluation certificate in the second repository 6b can be used, for example.

The issuing organization storage unit 4a has a function of holding template certificate disclosure destination information in addition to the above-described function. As the template certificate disclosure destination information, a URI (a uniform resource identifier) indicating the first apparatus evaluation certificate in the first repository 6a can be used, for example.

The template issuing organization 5a has a function of writing an issued template and the template certificate disclosure destination information in the issuing organization storage unit 4a into the first entity apparatus 10" to issue the first entity apparatus 10 and a function of writing a template certificate into the first repository 6a in place of the function of writing an issued template and a template certificate into the first entity apparatus 10" to issue the first entity apparatus 10 in the above-described functions. It is to be noted that the template certificate may include expiration date information.

The first repository 6a has a function of holding the first apparatus evaluation certificate which can be accessed by using the first apparatus evaluation certificate disclosure destination information or the template certificate disclosure destination information and is written from the first apparatus evaluating organization 3a and the template certificate written from the template issuing organization 5a in addition to the above-described functions.

The second repository 6b has a function of holding the second apparatus evaluation certificate which can be accessed by using the second apparatus evaluation certificate disclosure destination information and is written from the second apparatus evaluating organization 3b in addition to the above-described functions.

A certificate information storage unit 12 of the first entity apparatus 10 stores the first apparatus evaluation certificate disclosure destination information and the template certificate disclosure destination information in place of the first apparatus evaluation certificate Cert1 and the template certificate CertBT.

An authentication context generation unit 15 of the first entity apparatus 10 generates a first entity apparatus signature and a first authentication context AC1 by using the first apparatus evaluation certificate disclosure destination information and the template certificate disclosure destination information in place of the first apparatus evaluation certificate Cert1 and the template certificate BT. That is, the first entity apparatus signature is a signature generated by performing digital signature generation processing based on a first apparatus signing key K1 in a key storage unit 11 with respect to the template certificate disclosure destination information, the first apparatus evaluation certificate disclosure destination information, and the first apparatus signing key ID. The first authentication context AC1 is obtained by adding the first entity apparatus signature to the template certificate disclosure destination information, the first apparatus evaluation certificate disclosure destination information, and the first apparatus signing key ID.

A certificate information storage unit 22 of the second entity apparatus 20 stores the second apparatus evaluation certificate disclosure destination information in place of the second apparatus evaluation certificate Cert2.

An authentication context generation unit 24 of the second entity apparatus 20 generates a second entity apparatus signature and a second authentication context AC2 by using the second apparatus evaluation certificate disclosure destination information in place of the second apparatus evaluation certificate Cert2. That is, the second entity apparatus signature is a signature generated by performing digital signature generation processing based on a second apparatus signing key K2 in a key storage unit 21 with respect to a collation execution result, the second apparatus evaluation certificate disclosure destination information, and the second apparatus signing key ID. The second authentication context AC2 is obtained by adding the second entity apparatus signature to the collation execution result, the second apparatus evaluation certificate disclosure destination information, and the second apparatus signing key ID.

A control unit 42 of the verification apparatus 40 has a function of acquiring the template certificate CertBT and the first apparatus evaluation certificate Cert1 from the first repository 6a to be written into the storage unit 41 based on the template certificate disclosure destination information and the first apparatus evaluation certificate disclosure destination information included in the first authentication context AC1 received from a client apparatus 30 and a function of acquiring the second apparatus evaluation certificate Cert2 from the second repository 6b to be written into the storage unit 41 based on the second apparatus evaluation certificate disclosure destination information included in the second authentication context AC2 received from the client apparatus 30 in addition to the above-described functions.

Operations of the thus configured biometric authentication system will now be described.

(Preparation: FIG. 9 and Others)

The first and second apparatus manufacturers 2a and 2b operate in the same manner as described above to issue the first and second entity apparatuses 10' and 20'.

The first apparatus evaluating organization 3a writes the first apparatus evaluation certificate disclosure destination information into the first entity apparatus 10' in place of the first apparatus evaluation certificate Cert1 to issue a first entity apparatus 10" and also writes the first apparatus evaluation certificate Cert1 into the first repository 6a in the above-described operations.

The second apparatus evaluating organization 3b writes the second apparatus evaluation certificate disclosure destination information into the second entity apparatus 20' in place of the second apparatus evaluation certificate Cert2 to issue a second entity apparatus 20 and also writes the second apparatus evaluation certificate Cert2 into the second repository 6b in the above-described operations.

The template issuing organization 5a writes the template certificate disclosure destination information into the first entity apparatus 10" in place of the template certificate CertBT to issue the first entity apparatus 10 and also writes the template certificate CertBT into the first repository 6a in the above-described functions.

The first repository 6a holds the first apparatus evaluation certificate Cert1 and the template certificate CertBT in addition to the above-described respective pieces of information.

The second repository 6b holds the second apparatus evaluation certificate Cert2 in addition to the above-described respective pieces of information.

(Verification: FIG. 11 and Others)

Upon receiving an authentication request from the verification apparatus 40, the client apparatus 30 transmits this authentication request to the first entity apparatus 10.

When the first entity apparatus 10 receives this authentication request, it carries out an operation using the first apparatus evaluation certificate disclosure destination information and the template certificate disclosure destination information in place of the first apparatus evaluation certificate Cert1 and the template certificate CertBT to generate a first entity apparatus signature and a first authentication context AC1 and to transmit the first authentication context AC1 and a template BT to the client apparatus 30 in the above-described operations.

Upon receiving the template BT and the first authentication context AC1, the client apparatus 30 operates as described above to transmit the template BT and the authentication request to the second entity apparatus 20.

When the second entity apparatus 20 receives the authentication request and the template BT, it carries out an operation using the second apparatus evaluation certificate disclosure destination information in place of the second apparatus evaluation certificate Cert2 to generate a second entity apparatus signature and a second authentication context AC2 and to transmit the second authentication context AC2 to the client apparatus 30 in the above-described operations.

Upon receiving the second authentication context AC2 from the second entity apparatus 20, the client apparatus 30 transmits the first and second authentication contexts AC1 and AC2 to the verification apparatus 40.

When the verification apparatus 40 receives the first and second authentication contexts AC1 and AC2, it acquires respective pieces of apparatus signature verifying information VfS1 and VfS2, or respective signing key IDs and respective pieces of verifying information VfS1M, VfCert1, VfCertBT, VfS2M, and VfCert2 which are associated with each other from the first and second repositories 6a and 6b to be written into the storage unit 41 like the above description.

At this time, the verification apparatus 40 acquires the template certificate CertBT and the first apparatus evaluation certificate Cert1 from the first repository 6a to be written into the storage unit 41 based on the template certificate disclosure destination information and the first apparatus evaluation certificate disclosure destination information included in the first authentication context AC1.

Further, the verification apparatus 40 acquires the second apparatus evaluation certificate Cert2 from the second repository 6b and writes it into the storage unit 41 based on the second apparatus evaluation certificate disclosure destination information included in the second authentication context AC2.

Then, the verification apparatus 40 verifies the first and second authentication contexts AC1 and AC2 based on respective pieces of verifying information, the template certificate CertBT, and the first and second apparatus evaluation certificates Cert1 and Cert2 as described above.

As a result, a verifier can verify whether a template or apparatus evaluation information having an authentication context written therein has been issued by an appropriate apparatus evaluating organization that has performed evaluation. Furthermore, since the template certificate CertBT, the first apparatus evaluation certificate Cert1, and the second apparatus evaluation certificate Cert2 are not held in the respective entity apparatuses 10 and 20, the respective certificates can be easily changed in the respective repositories 6a and 6b.

As explained above, according to this embodiment, with the configuration where the template certificate CertBT and the first apparatus evaluation certificate Cert1 are acquired from the first repository 6a (a disclosure destination apparatus) based on the template certificate disclosure destination information and the first apparatus evaluation certificate disclosure destination information included in the first authentication context AC1 and the second apparatus evaluation certificate Cert2 is acquired from the second repository 6b (a disclosure destination apparatus) based on the second apparatus evaluation certificate disclosure destination information included in the second authentication context AC2, since updating the respective certificates in the first and second repositories 6a and 6b can suffice at the time of updating the respective certificates, a change can be readily reflected in all the entity apparatuses 10 and 20 when the template certificate or the apparatus evaluating information is changed.

For example, when the authenticity of each of a template and a biometric collation apparatus (the second entity apparatus 20) can be verified and the authenticity of each of the template certificate CertBT and the biometric collation apparatus is guaranteed with an expiration date, providing new guarantee information resulting from the expiration enables continuously verifying the authenticity.

Additionally, the verification processing itself is the same as that in the first embodiment, thereby obtaining the same verification processing effect as that in the first embodiment.

The method exhibited in each above-mentioned embodiment can be distributed as a computer executable program by storing into a storage medium such as a magnetic disk (Floppy™ disk, hard disk, etc.), an optical disk (CD-ROM, DVD, etc.), a magnet-optical disk (MO) and a semiconductor memory.

Regardless of type of storage format, any storage medium capable of storing the program and being read by the computer is usable as the storage medium for this program.

An operating system (OS) or middleware (MW) such as a database management software and a network software running on the computer, based on the instruction installed in the computer from the storage medium, may executes a part of each processing to achieve each above-described embodiment.

The storage medium for the invention is not limited to a medium independent from the computer, and includes the storage medium with a program transmitted via a LAN, the Internet, etc., downloaded and stored or temporarily stored thereon.

The number of the storage medium for the invention is not limited only one, and the storage medium of the invention includes the case that processing in each embodiment is respectively executed by means of a plurality of media, and any structure of the medium is acceptable.

The computer in the invention executes each processing in each above mentioned embodiment, based on the program stored in the storage medium. Any configuration of the computer such as a device composed of a single personal computer, etc., and a system composed of a plurality of devices network-connected therein are available.

The computer in the invention is not limited to a personal computer, and includes computing processing device, a micro-computer, etc., included in information processing equipment and generically means equipment and a device capable of achieving the functions of the invention.

The invention in its broader aspects is not limited to the specific details and representative embodiments shown and described herein, and can be embodied in their implementation phases by modifying constituent components without departing from the spirit or scope of the general inventive concept of the invention. A variety of modifications of the invention may be made by appropriate combinations of a plurality of constituent components shown in each foregoing embodiment. For example, some constituent components may be omitted from the whole of the constituent components shown in each embodiment. Furthermore, the constituent components over different embodiments can be appropriately combined.

As explained above, according to the present invention, the validity of a template used for the authentication or apparatus evaluation information included in an authentication context can be verified. Further, when a template certificate or apparatus evaluating information is changed, this change can be easily reflected in all entity apparatuses.

What is claimed is:

1. A verification apparatus which verifies respective authentication contexts received from a client apparatus connected with a first entity apparatus which generates a first authentication context and a second entity apparatus which generates a second authentication context, comprising:

a storage device which stores first apparatus signature verifying information having a first apparatus ID, a first apparatus manufacturer ID and first apparatus manufacturer signature verifying information which are associated with each other, a first apparatus evaluating organization ID and first apparatus evaluation certificate verifying information which are associated with each other, a template issuing organization ID and template certificate verifying information which are associated with each other, a second apparatus signature verifying information having a second apparatus ID, a second apparatus manufacturer ID and second apparatus manufacturer signature verifying information which are associated with each other, and a second apparatus evaluating organization ID and second apparatus evaluation certificate verifying information which are associated with each other; and a control device configured to execute first to 10th verification processing and first to third judgment processing, the respective pieces of processing including:

first verification processing of searching the storage device by using the first apparatus ID in the first authentication context and verifying a first entity apparatus signature in the first authentication context based on the first apparatus signature verifying information associated with the first apparatus ID upon receiving via the client apparatus from the first entity apparatus the first authentication context including (a1) a template certificate obtained by adding a template issuing organization signature to template correspondence information and the template issuing organization ID, (a2) a first apparatus evaluation certificate obtained by adding a first apparatus evaluating organization signature to the first apparatus ID, first apparatus evaluating information, and the first apparatus evaluating organization ID, the first apparatus evaluation certificate indicating evaluation for security strength of the first entity apparatus, (a3) the first apparatus ID, and (a4) the first entity apparatus signature added to the template certificate, the first apparatus evaluation certificate, and the first apparatus ID;

second verification processing of searching the storage device by using the first apparatus ID in the first authentication context to read first apparatus signature verifying information having the first apparatus ID from the storage device and searching the storage device by using the first apparatus manufacturer ID in the first apparatus signature verifying information to verify a first apparatus manufacturer signature in the first apparatus signature verifying information based on the first apparatus manufacturer signature verifying information associated with the first apparatus manufacturer ID in the storage device;

third verification processing of verifying that the first apparatus ID in the first authentication context coincides with the first apparatus ID in the first apparatus evaluation certificate of the first authentication context;

fourth verification processing of searching the storage device by using the first apparatus evaluating organization ID in the first apparatus evaluation certificate to verify the first apparatus evaluating organization signature in the first apparatus evaluation certificate based on first apparatus evaluating organization verifying information associated with the first apparatus evaluating organization ID in the storage device;

fifth verification processing of searching the storage device by using the template issuing organization ID in the template certificate of the first authentication context to verify the template issuing organization signature in the template certificate based on template issuing organization verifying information associated with the template issuing organization ID in the storage device;

sixth verification processing of searching the storage device by using the second apparatus ID in the second authentication context to verify a second entity apparatus signature in the second authentication context based on the second apparatus signature verifying information associated with the second apparatus ID in the storage device upon receiving through the client apparatus from the second entity apparatus the second authentication context including (b1) an authentication execution result generated by the second entity apparatus, (b2) template correspondence information corresponding to template used for the authentication, (b3) a second apparatus evaluation certificate obtained by adding a second apparatus evaluating organization signature to the second apparatus ID, the second apparatus evaluating information, and the second apparatus evaluating organization ID, the second apparatus evaluation certificate indicating evaluation for security strength of the second entity apparatus, and (b4) the second entity apparatus signature added to the authentication execution result, the template correspondence information, the second apparatus evaluation certificate, and the second apparatus ID;

seventh evaluation processing of searching the storage device by using the second apparatus ID in the second authentication context to read the second apparatus signature verifying information having the second apparatus ID from the storage device and searching the storage device by using the second apparatus manufacturer ID in the second apparatus signature verifying information to verify a second apparatus manufacturer signature in the second apparatus signature verifying information based on the second apparatus manufacturer signature verifying information associated with the second apparatus manufacturer ID in the storage device;

eighth verification processing of verifying that the second apparatus ID in the second authentication context coincides with the second apparatus ID in the second apparatus evaluation certificate of the second authentication context;

ninth verification processing of searching the storage device by using the second apparatus evaluating organization ID in the second apparatus evaluation certificate to verify a second apparatus evaluating organization signature in the second apparatus evaluation certificate based on the second apparatus evaluating organization verifying information associated with the second apparatus evaluating organization ID in the storage device;

10th verification processing of verifying that the template correspondence information in the second authentication context coincides with the template correspondence information in the template certificate of the first authentication context;

the first judgment processing of determining that the first and second contexts are valid when all verification results obtained by the first to 10th verification processing are valid;

the second judgment processing of determining that the whether the first apparatus evaluating information, the second apparatus evaluating information, or the authentication execution result reaches predetermined authentication success criteria is judged when the first and second contexts are valid; and the third judgment processing of determining that the authentication is successful when the first apparatus evaluating information, the second apparatus evaluating information, and the authentication execution result reach the criteria.

2. A verification apparatus which verifies respective authentication contexts received from a client apparatus connected with a first entity apparatus which generates a first authentication context and a second entity apparatus which generates a second authentication context, comprising:

a storage device which stores first apparatus signature verifying information having a first apparatus ID, a first apparatus manufacturer ID and first apparatus manufacturer signature verifying information which are associated with each other, a first apparatus evaluating organization ID and first apparatus evaluation certificate verifying information which are associated with each other, a template issuing organization ID and template certificate verifying information which are associated with each other, a second apparatus signature verifying information having a second apparatus ID, a second apparatus manufacturer ID and second apparatus manufacturer signature verifying information which are associated with each other, and a second apparatus evaluating organization ID and second apparatus evaluation certificate verifying information which are associated with each other; and a control device configured to execute first and second write processing, first to 10th verification processing and first to third judgment processing, the respective pieces of processing including:

first write processing of acquiring a template certificate and a first apparatus evaluation certificate from a disclosure destination apparatus to be written into the storage device based on template certificate disclosure destination information and first apparatus evaluation certificate disclosure destination information included in the first authentication context upon receiving via the client apparatus from the first entity apparatus the first authentication context including (a1') template certificate disclosure destination information indicative of a disclosure destination of a template certificate obtained by adding a template issuing organization signature to template correspondence information and a template issuing organization ID, (a2') first apparatus evaluation certificate disclosure destination information indicative of a disclosure destination of a first apparatus evaluation certificate obtained by adding a first apparatus evaluating organization signature to the first apparatus ID, first apparatus evaluating information, and the first apparatus evaluating organization ID, the first apparatus evaluation certificate indicating evaluation for security strength of the first entity apparatus, (a3') the first apparatus ID, and (a4') a first entity apparatus signature added to the template certificate disclosure destination information, the first apparatus evaluation certificate disclosure destination information, and the first apparatus ID;

first verification processing of searching the storage device by using the first apparatus ID in the first authentication context to verify the first entity apparatus signature in the first authentication context based on the first apparatus signature verifying information associated with the first apparatus ID;

second verification processing of searching the storage device by using the first apparatus ID in the first authentication context to read the first apparatus signature verifying information having the first apparatus ID from the storage device and searching the storage device by using the first apparatus manufacturer ID in the first apparatus signature verifying information to verify a first apparatus manufacturer signature in the first apparatus signature verifying information based on the first apparatus manufacturer signature verifying information associated with the first apparatus manufacturer ID in the storage device;

third verification processing of verifying that the first apparatus ID in the first authentication context coincides with the first apparatus ID in the first apparatus evaluation certificate of the first authentication context;

fourth verification processing of searching the storage device by using the first apparatus evaluating organization ID in the first apparatus evaluation certificate to verify the first apparatus evaluating organization signature in the first apparatus evaluation certificate based on first apparatus evaluating organization verifying information associated with the first apparatus evaluating organization ID in the storage device;

fifth verification processing of searching the storage device by using the template issuing organization ID in the template certificate of the first authentication context to verify a template organization signature in the template certificate based on template issuing organization verifying information associated with the template issuing organization ID in the storage device;

second write processing of acquiring a second apparatus evaluation certificate from a disclosure destination apparatus to be written into the storage device based on second apparatus evaluation certificate disclosure destination information included in the second authentication context upon receiving via the client apparatus from the second entity apparatus the second authentication context including (b1) an authentication execution result generated by the second entity apparatus, (b2) template correspondence information corresponding to template used for the authentication, (b3') the second apparatus evaluation certificate disclosure destination information indicative of a disclosure destination of the second apparatus evaluation certificate obtained by adding a second apparatus evaluating organization signature to the second apparatus ID, the second apparatus evaluating information, and the second apparatus evaluating organization ID, the second apparatus evaluation certificate indicating evaluation for security strength of the second entity apparatus, and (b4') a second entity apparatus signature added to the authentication execution result, the template correspondence information, the second apparatus evaluation certificate disclosure destination information, and the second apparatus ID;

sixth verification processing of searching the storage device by using the second apparatus ID in the second authentication context to verify the second entity apparatus signature in the second authentication context based on the second apparatus signature verifying information associated with the second apparatus ID in the storage device;

seventh verification processing of searching the storage device by using the second apparatus ID in the second authentication context to read the second apparatus signature verifying information having the second apparatus ID from the storage device, and searching the storage device by using the second apparatus manufacturer ID in the second apparatus signature verifying information to verify a second apparatus manufacturer signature in the second apparatus signature verifying information based on second apparatus manufacturer signature verifying information associated with the second apparatus manufacturer ID in the storage device;

eighth verification processing of verifying that the second apparatus ID in the second authentication context coincides with the second apparatus ID in the second apparatus evaluation certificate of the second authentication context;

ninth verification processing of searching the storage device by using the second apparatus evaluating organization ID in the second apparatus evaluation certificate to verify a second apparatus evaluating organization signature in the second apparatus evaluation certificate based on second apparatus evaluating organization verifying information associated with the second apparatus evaluating organization ID in the storage device;

10th verification processing of verifying that the template correspondence information in the second authentication context coincides with the template correspondence information in the template certificate of the first authentication context;

the first judgment processing of determining that the first and second authentication contexts are valid when all verification results obtained by the first to 10th verification processing are valid;

the second judgment processing of determining that whether the first apparatus evaluating information, the second apparatus evaluating information, or the authentication execution result reaches predetermined authentication success criteria is judged when the first and second contexts are valid; and the third judgment processing of determining that the authentication is successful when the first apparatus evaluating information, the second apparatus evaluating information, and the authentication execution result reach the criteria.

3. A non-transitory computer-readable storage medium for use in a verification apparatus that verifies respective authentication contexts received from a client apparatus connected with a first entity apparatus which generates a first authentication context and a second entity apparatus which generates a second authentication context and that includes a storage device, said medium storing program code comprising:

a program code which allows the verification apparatus to sequentially execute processing of writing into the storage device first apparatus signature verifying information having a first apparatus ID, a first apparatus manufacturer ID and first apparatus manufacturer signature verifying information which are associated with each other, a first apparatus evaluating organization ID and first apparatus evaluation certificate verifying information which are associated with each other, a template issuing organization ID and template certificate verifying information which are associated with each other, second apparatus signature verifying information having a second apparatus ID, a second apparatus manufacturer ID and second apparatus manufacturer signature verifying information which are associated with each other, and a second apparatus evaluating organization ID and second apparatus evaluation certificate verifying information which are associated with each other;

a program code which allows the verification apparatus to sequentially execute first verification processing of searching the storage device by using the first apparatus ID in the first authentication context to verify a first entity apparatus signature in the first authentication context based on the first apparatus signature verifying information associated with the first apparatus ID upon receiving via the client apparatus from the first entity apparatus the first authentication context including (a1) a template certificate obtained by adding a template issuing organization signature to template correspondence information and the template issuing organization ID, (a2) a first apparatus evaluation certificate obtained by adding a first apparatus evaluating organization signature to the first apparatus ID, the first apparatus evaluating information, and the first apparatus evaluating organization ID, the first apparatus evaluation certificate indicating evaluation for security strength of the first entity apparatus, (a3) the first apparatus ID, and (a4) the first entity apparatus signature added to the template certificate, the first apparatus evaluation certificate, and the first apparatus ID;

a program code which allows the verification apparatus to sequentially execute second verification processing of searching the storage device by using the first apparatus ID in the first authentication context to read the first apparatus signature verifying information having the first apparatus ID from the storage device, and searching the storage device by using the first apparatus manufacturer ID in the first apparatus signature verifying information to verify a first apparatus manufacturer signature in the first apparatus signature verifying information based on the first apparatus manufacturer signature verifying information associated with the first apparatus manufacturer ID in the storage device;

a program code which allows the verification apparatus to sequentially execute third verification processing of verifying that the first apparatus ID in the first authentication context coincides with the first apparatus ID in the first apparatus evaluation certificate of the first authentication context;

a program code which allows the verification apparatus to sequentially execute fourth verification processing of searching the storage device by using the first apparatus evaluating organization ID in the first apparatus evaluation certificate to verify the first apparatus evaluating organization signature in the first apparatus evaluation certificate based on first apparatus evaluating organization verifying information associated with the first apparatus evaluating organization ID in the storage device;

a program code which allows the verification apparatus to sequentially execute fifth verification processing of searching the storage device by using the template issuing organization ID in the template certificate of the first authentication context to verify a template issuing organization signature in the template certificate based on template issuing organization verifying information associated with the template issuing organization ID in the storage device;

a program code which allows the verification apparatus to sequentially execute sixth verification processing of searching the storage device by using the second apparatus ID in the second authentication context to verify a second entity apparatus signature in the second authentication context based on the second apparatus signature verifying information associated with the second apparatus ID in the storage device upon receiving via the client apparatus from the second entity apparatus the second authentication context including (b1) an authentication execution result generated by the second entity apparatus, (b2) template correspondence information corresponding to template used for the authentication, (b3) a second apparatus evaluation certificate obtained by adding a second apparatus evaluating organization signature to the second apparatus ID, second apparatus evaluating information, and the second apparatus evaluating organization ID, the second apparatus evaluation certificate indicating evaluation for security strength of the second entity apparatus, and (b4) a second entity apparatus signature added to the authentication execution result, the template correspondence information, the second apparatus evaluation certificate, and the second apparatus ID, a program code which allows the verification apparatus to sequentially execute seventh verification processing of searching the storage device by using the second apparatus ID in the second authentication context to read the second apparatus signature verifying information having the second apparatus ID from the storage device, and searching the storage device by using the second apparatus manufacturer ID in the second apparatus signature verifying information to verify a second apparatus manufacturer signature in the second apparatus signature verifying information based on the second apparatus manufacturer verifying information associated with the second apparatus manufacturer ID in the storage device;

a program code which allows the verification apparatus to sequentially execute eighth verification processing of verifying that the second apparatus ID in the second authentication context coincides with the second apparatus ID in the second apparatus evaluation certificate of the second authentication context;

a program code which allows the verification apparatus to sequentially execute ninth verification processing of searching the storage device by using the second apparatus evaluating organization ID in the second apparatus evaluation certificate to verify the second apparatus evaluating organization signature in the second apparatus evaluation certificate based on second apparatus evaluating organization verifying information associated with the second apparatus evaluating organization ID in the storage device;

a program code which allows the verification apparatus to sequentially execute 10th verification processing of verifying that the template correspondence information in the second authentication context coincides with the template correspondence information in the template certificate of the first authentication context;

a program code which allows the verification apparatus to sequentially execute first judgment processing of determining that the first and second authentication contexts are valid when all verification results obtained by the first to 10th verification processing are valid;

a program code which allows the verification apparatus to sequentially execute second judgment processing of determining that whether the first apparatus evaluating information, the second apparatus evaluating information, or the authentication execution result reaches predetermined authentication success criteria is judged when the first and second contexts are valid; and a program code which allows the verification apparatus to sequentially execute third judgment processing of determining that the authentication is successful when the first apparatus evaluating information, the second apparatus evaluating information, and the authentication execution result reach the criteria.

4. A non-transitory computer-readable storage medium for use in a verification apparatus that verifies respective authentication contexts received from a client apparatus connected with a first entity apparatus which generates a first authentication context and a second entity apparatus which generates a second authentication context and that includes a storage device, said medium storing program code comprising:

a program code which allows the verification apparatus to sequentially execute processing of writing into the storage device first apparatus signature verifying information having a first apparatus ID, a first apparatus manufacturer ID and first apparatus manufacturer signature verifying information which are associated with each other, a first apparatus evaluating organization ID and first apparatus evaluation certificate verifying information which are associated with each other, a template issuing organization ID and template certificate verifying information which are associated with each other, second apparatus signature verifying information having a second apparatus ID, a second apparatus manufacturer ID and second apparatus manufacturer signature verifying information which are associated with each other, and a second apparatus evaluating organization ID and second apparatus evaluation certificate verifying information which are associated with each other;

a program code which allows the verification apparatus to sequentially execute processing of acquiring the template certificate and the first apparatus evaluation certificate from a disclosure destination apparatus to be written into the storage device based on template certificate disclosure destination information and first apparatus evaluation certificate disclosure destination information included in the first authentication context upon receiving from the first entity apparatus via the client apparatus the first authentication context including (a1') the template certificate disclosure destination information indicative of a disclosure destination of the template certificate obtained by adding a template issuing organization signature to template correspondence information and a template issuing organization ID, (a2') the first apparatus evaluation certificate disclosure destination information indicative of a disclosure destination of the first apparatus evaluation certificate obtained by adding a first apparatus evaluating organization signature to the first apparatus ID, first apparatus evaluating information, and the first apparatus evaluating organization ID, the first apparatus evaluation certificate indicating evaluation for security strength of the first entity apparatus, (a3) the first apparatus ID, and (a4') a first entity apparatus signature added to the template certificate disclosure destination information, the first apparatus evaluation certificate disclosure destination information, and the first apparatus ID;

a program code which allows the verification apparatus to sequentially execute first verification processing of searching the storage device by using the first apparatus ID in the first authentication context to verify the first entity apparatus signature in the authentication context based on the first apparatus signature verifying information associated with the first apparatus ID;

a program code which allows the verification apparatus to sequentially execute second verification processing of searching the storage device by using the first apparatus ID in the first authentication context to read the first apparatus signature verifying information having the first apparatus ID from the storage device, searching the storage device by using the first apparatus manufacturer ID in the first apparatus signature verifying information to verify a first apparatus manufacturer signature in the first apparatus signature verifying information based on first apparatus manufacturer signature verifying information associated with the first apparatus manufacturer ID in the storage device;

a program code which allows the verification apparatus to sequentially execute third verification processing of verifying that the first apparatus ID in the first authentication context coincides with the first apparatus ID in the first apparatus evaluation certificate of the first authentication context;

a program code which allows the verification apparatus to sequentially execute fourth verification processing of searching the storage device by using the first apparatus evaluating organization ID in the first apparatus evaluation certificate to verify the first apparatus evaluating organization signature in the first apparatus evaluation certificate based on first apparatus evaluating organization verifying information associated with the first apparatus evaluating organization ID in the storage device;

a program code which allows the verification apparatus to sequentially execute fifth verification processing of searching the storage device by using the template issuing organization ID in the template certificate of the first authentication context to verify a template issuing organization signature in the template certificate based on template issuing organization verifying information associated with the template issuing organization ID in the storage device;

a program code which allows the verification apparatus to sequentially execute processing of acquiring the second apparatus evaluation certificate from a disclosure destination apparatus to be written into the storage device based on second apparatus evaluation certificate disclosure destination information included in the second authentication context upon receiving via the client apparatus from the second entity apparatus the second authentication context including (b1) an authentication execution result generated by the second entity apparatus, (b2) template correspondence information corresponding to template used for the authentication, (b3') the second apparatus evaluation certificate disclosure destination information indicative of a disclosure destination of a second apparatus evaluation certificate obtained by adding a second apparatus evaluating organization signature to the second apparatus ID, the second apparatus evaluating information, and the second apparatus evaluating organization ID, the second apparatus evaluation certificate indicating evaluation for security strength of the second entity apparatus, and (b4') a second entity apparatus signature added to the authentication execution result, the template correspondence information, the second apparatus evaluation certificate disclosure destination information, and the second apparatus ID;

a program code which allows the verification apparatus to sequentially execute sixth verification processing of searching the storage device by using the second apparatus ID in the second authentication context to verify the second entity apparatus signature in the second authentication context based on second apparatus signature verifying information associated with the second apparatus ID in the storage device;

a program code which allows the verification apparatus to sequentially execute seventh verification processing of searching the storage device by using a second apparatus ID in the second authentication context to read the second apparatus signature verifying information having the second apparatus ID from the storage device, searching the storage device by using a second apparatus manufacturer ID in the second apparatus signature verifying information to verify a second apparatus manufacturer signature in the second apparatus signature verifying information based on second apparatus manufacturer signature verifying information associated with the second apparatus manufacturer ID in the storage device;

a program code which allows the verification apparatus to sequentially execute eighth verification processing of verifying that the second apparatus ID in the second authentication context coincides with the second apparatus ID in the second apparatus evaluation certificate of the second authentication context;

a program code which allows the verification apparatus to sequentially execute ninth verification processing of searching the storage device by using the second apparatus evaluating organization ID in the second apparatus evaluation certificate to verify a second apparatus evaluating organization signature in the second apparatus evaluation certificate based on second apparatus evaluating organization verifying information associated with the second apparatus evaluating organization ID in the storage device;

a program code which allows the verification apparatus to sequentially execute 10th verification processing of verifying that the template correspondence information in the second authentication context coincides with the template correspondence information in the template certificate of the first authentication context;

a program code which allows the verification apparatus to sequentially execute first judgment processing of determining that the first and second authentication contexts are valid when all verification results obtained by the first to 10th verification processing are valid;

a program code which allows the verification apparatus to sequentially execute second judgment processing of determining that whether the first apparatus evaluating information, the second apparatus evaluating information, or the authentication execution result reaches predetermined authentication success criteria is judged when the first and second contexts are valid; and a program code which allows the verification apparatus to sequentially execute third judgment processing of determining that the authentication is successful when the first apparatus evaluating information, the second apparatus evaluating information, and the authentication execution result reach the criteria.

\* \* \* \* \*